(12) United States Patent
Tachibana et al.

(10) Patent No.: US 10,732,329 B2
(45) Date of Patent: Aug. 4, 2020

(54) IMAGE PROJECTING STRUCTURE AND IMAGE PROJECTING METHOD

(71) Applicant: AGC Inc., Chiyoda-ku (JP)

(72) Inventors: Yuko Tachibana, Chiyoda-ku (JP); Yukihiro Tao, Chiyoda-ku (JP); Kenta Sekikawa, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 310 days.

(21) Appl. No.: 15/937,118

(22) Filed: Mar. 27, 2018

(65) Prior Publication Data

US 2018/0239066 A1 Aug. 23, 2018

Related U.S. Application Data

(63) Continuation of application No. PCT/JP2016/078803, filed on Sep. 29, 2016.

(30) Foreign Application Priority Data

Sep. 30, 2015 (JP) .................................. 2015-192576

(51) Int. Cl.
 *G02B 5/02* (2006.01)
 *G03B 21/14* (2006.01)
 (Continued)

(52) U.S. Cl.
 CPC .............. *G02B 5/0221* (2013.01); *G02B 5/02* (2013.01); *G02B 5/0226* (2013.01);
 (Continued)

(58) Field of Classification Search
 CPC ......... G02B 5/02; G02B 5/021; G02B 5/0221
 See application file for complete search history.

(56) References Cited

U.S. PATENT DOCUMENTS

| 7,245,433 B2 * | 7/2007 | Yano ....................... B32B 27/00 |
| | | 359/599 |
| 7,777,960 B2 | 8/2010 | Freeman |
| (Continued) | | |

FOREIGN PATENT DOCUMENTS

| JP | 2010-231080 | 10/2010 |
| JP | 2010-539525 | 12/2010 |
| | (Continued) | |

OTHER PUBLICATIONS

International Search Report dated Dec. 20, 2016 in PCT/JP2016/078803, filed on Sep. 29, 2016.
(Continued)

*Primary Examiner* — Robert E. Tallman
(74) *Attorney, Agent, or Firm* — Oblon, McClelland, Maier & Neustadt, L.L.P.

(57) ABSTRACT

To provide an image projecting structure having a wide viewing angle and whereby the visibility of a projected image is high. The image projecting structure comprises a first transparent layer having irregularities formed on its surface, a reflective film formed on the surface on which the irregularities are formed, of the first transparent layer, and a second transparent layer formed on the reflective film, wherein the transmittance of visible light is from 5 to 95%; the value obtained by dividing the haze by the diffuse reflectance of visible light is at least 0.1 and at most 1; the vertical difference Sk in the core section defined by ISO 25178, of the surface on which the irregularities are formed, is at least 0.1 μm; and the value obtained by dividing the shortest autocorrelation length Sal by the vertical difference Sk in the core section is at least 1.2 and at most 190.

11 Claims, 15 Drawing Sheets

(51) Int. Cl.
  *G03B 21/60* (2014.01)
  *G02B 27/01* (2006.01)
(52) U.S. Cl.
  CPC ......... *G02B 27/0101* (2013.01); *G03B 21/14* (2013.01); *G03B 21/60* (2013.01)

(56) References Cited

U.S. PATENT DOCUMENTS

| | | | |
|---|---|---|---|
| 8,354,162 B2* | 1/2013 | Yoshihara | G02B 1/10 428/172 |
| 9,720,155 B2* | 8/2017 | Zhou | B32B 27/08 |
| 10,416,354 B2* | 9/2019 | Takai | G02B 5/0278 |
| 2005/0041213 A1 | 2/2005 | Paukshto | |
| 2016/0282522 A1 | 9/2016 | Schiavoni et al. | |

FOREIGN PATENT DOCUMENTS

| | | |
|---|---|---|
| JP | 2014-71250 | 4/2014 |
| JP | 2014-509963 | 4/2014 |
| JP | 2016-109953 | 6/2016 |
| WO | WO 2010/016369 A1 | 2/2010 |
| WO | WO 2015/063418 A1 | 5/2015 |
| WO | WO 2015/186668 A1 | 12/2015 |

OTHER PUBLICATIONS

U.S. Appl. No. 15/366,745, filed Dec. 1, 2016, 2017/0082915 A1, Yukihiro Tao, et al.

* cited by examiner

Fig. 9
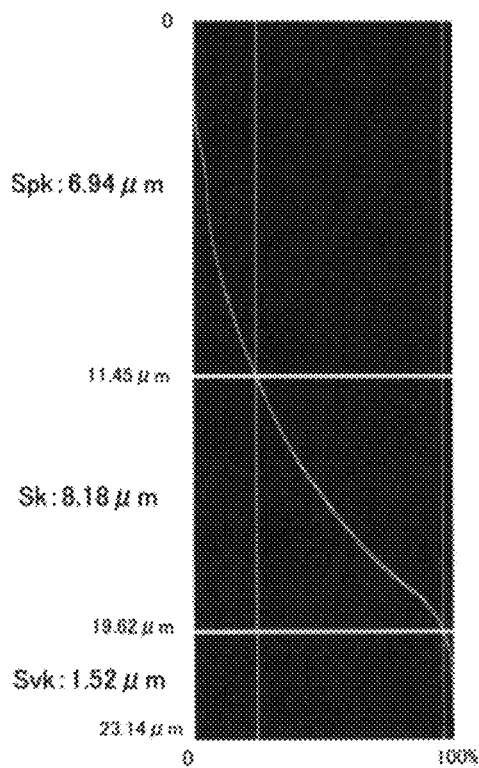
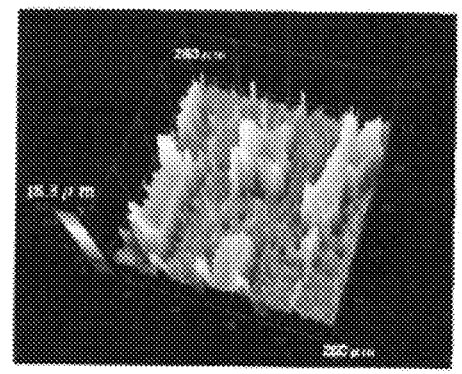
Fig. 10A
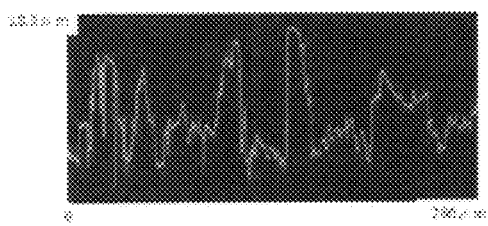
Fig. 10B
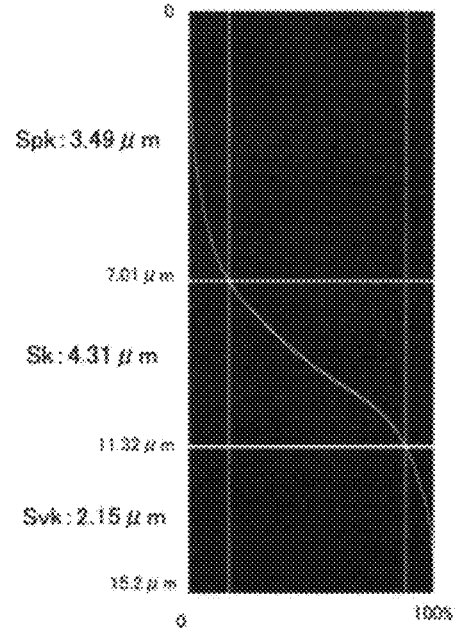
Fig. 10C

Haze/diffuse reflectance of visible light

Lamp reflected light intensity attenuation rate (dB)

(Short focus projector)

(Short focus projector)

IMAGE PROJECTING STRUCTURE AND IMAGE PROJECTING METHOD

This application is a continuation of PCT Application No. PCT/JP2016/078803, filed on Sep. 29, 2016, which is based upon and claims the benefit of priority from Japanese Patent Application No. 2015-192576 filed on Sep. 30, 2015. The contents of those applications are incorporated herein by reference in their entireties.

TECHNICAL FIELD

The present invention relates to an image projecting structure whereby an image in the background is also visible.

BACKGROUND ART

A screen for visibly displaying image light projected from a common projector, is intended to display the image light projected from the projector, and an image on the opposite side (rear side) of the screen as viewed from the observer cannot be observed. For example, by a transmitting type screen, it is possible to transmit light from the rear side for displaying an image by transmitting the image light projected from the rear side to the observer side (front side). However, by such a common transmitting type screen, although it is possible to transmit light, it is not possible to observe a view of the rear side.

As a reflective screen whereby it is possible to observe an image on the rear side, there is one having such a structure that irregularities with periodicity are formed on the surface of a transparent substrate, a thin metal film is deposited on the formed irregularities, and further on the metal film, a transparent material is packed to fill the irregularities (see e.g. Patent Document 1).

Further, in Patent Document 2, a layered member is disclosed wherein a center layer with a uniform thickness having irregularities is sandwiched between two outer layers, the refractive index of the two outer layers are substantially the same, and the refractive index of the central layer is designed to be different from the refractive index of the outer layers.

PRIOR ART DOCUMENTS

Patent Documents

Patent Document 1: JP-A-2010-539525
Patent Document 2: JP-A-2014-509963

DISCLOSURE OF INVENTION

Technical Problem

In a case where a screen of the structure as disclosed in Patent Document 1 is used, image visibility is not high enough due to the lack of brightness of the image at the time of observing the image light to be displayed or the view of the rear side.

As utilization of a window, an application for projecting an image, etc. on the window provided e.g. in a room, is desired. That is, an image projecting window is desired such that when not projecting an image, it acts as a transparent window so that the outside view can be seen from inside of the room, and when the projector in the room is projecting an image, the window functions as a screen so that a projected image can be seen in the room. However, Patent Document 1 does not disclose how it is possible to attain both visibility of the image and visibility of the background.

FIGS. 29 to 32 are explanatory views for illustrating usage of an image projecting structure. Here, in FIGS. 29 to 32, one observer 200 is illustrated, but there may be a case where a plurality of observers 200 are present.

As shown in FIG. 29, when an observer 200 is present at the position of the regular reflection light by the reflection of the image projecting structure 101 of light projected from the projector 110, the visibility of the projection surface (screen) is high. As shown in FIG. 30, with respect to the light reflected at the end of the image projecting structure 101, the number of observers 200 who can view the image by regular reflection light is small. That is, the visibility at the end portion of the screen is lower for many observers 200. Further, since the projector 110 is usually installed at an end to the image projecting structure 101, the reflection angle of the light reflected at the other end of the image projecting structure 101 becomes smaller as the screen becomes larger, whereby the number of observers 200 to which visibility of the image by the regular reflection light becomes lower, tends to be larger.

Further, in a case where the projector 110 is a short focus projector, as shown in FIGS. 31 and 32, the distance between the installation position of the projector 110 and the image projecting structure 101 is short, whereby the number observers 200 to which the visibility of the screen becomes lower tends to be larger.

In order to prevent variation in the visibility of the screen depending on the position of observers 200 to the image projecting structure 101 as described above, in other words, in order to provide at least a certain degree of visibility for many observers 200, an image projecting structure with a wide viewing angle is desired.

Further, Patent Document 2 discloses that the layered member exhibits a high diffuse reflectance to light from the front side, and whereby a view on the rear side is visible, and thus, it is suitably applied to e.g. a head-up display (HUD). However, in an application to e.g. HUD, a large viewing angle is not required. Further, Patent Document 2 provides no disclosure or suggestion relating to obtaining a layered member having a large viewing angle.

The present invention has an object to provide an image projecting structure whereby the viewing angle is wide, and the visibility of the projected image is high.

Solution to Problem

The image projecting structure according to the present invention comprises a first transparent layer having irregularities formed on its surface, a reflective film formed on the surface on which the irregularities are formed, of the first transparent layer, and a second transparent layer formed on the reflective film, and is characterized in that the transmittance of visible light is from 5 to 95%, the value obtained by dividing the haze by the diffuse reflectance of visible light is at least 0.1 and at most 1, the vertical difference Sk in the core section defined by ISO 25178 of the surface on which the irregularities are formed, is at least 0.1 μm, and the value obtained by dividing the shortest autocorrelation length Sal by the vertical difference Sk in the core section is at least 1.2 and at most 190.

The image projecting method according to the present invention is characterized in that an image from a projector is projected on the above image projecting structure.

Advantageous Effects of Invention

According to the present invention, the viewing angle is wide, and it is possible to improve the visibility of the entire projection surface.

BRIEF DESCRIPTION OF DRAWINGS

FIG. 9 is an explanatory view showing the load curve in Example 3.

FIGS. 10A-10C are explanatory views showing the three-dimensional shape of the irregularity surface of the first transparent layer in Comparative Example 1, the two-dimensional cross-sectional profile in one cross section and the load curve.

DESCRIPTION OF EMBODIMENTS

Figure 1:
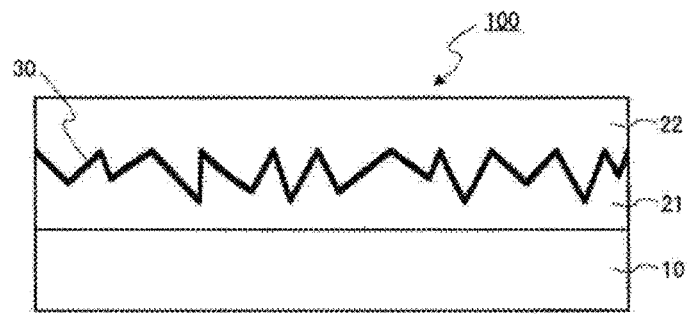
FIG. 1 is an explanatory view showing the structure of an image projecting structure.

Meanings of the following terms in this specification are as follows.

The "irregular structure" is meant for an irregularity shape comprising a plurality of protrusions and/or a plurality of recesses.

The "visible light transmittance" means the proportion (percentage) of the total transmitted light transmitted to the opposite surface side, to the incident light entered at an incident angle of 0° from one surface of an image projecting structure. That is, it is a usual total light transmittance to be measured by the method described in JIS K 7361: 1997 (ISO 13468-1: 1996).

The "haze" means the percentage of transmitted light deviated by at least 0.044 rad (2.5°) from the incident light by forward scattering, among the transmitted light entered from one surface of an image projecting structure and transmitted to the opposite surface. That is, it is a usual haze to be measured by the method described in JIS K7136: 2000 (ISO 14782: 1999).

The "diffuse reflectance" is a value where the ratio of the total amount of light reflected and scattered to a backward direction to the incident light, is represented by a percentage. The diffuse reflectance means the proportion (percentage) of reflected light deviated by at least 0.044 rad (2.5°) from the regularly reflected light reflected to the opposite surface side, to the incident light entered at an incident angle of 0° from one surface of an image projecting structure. At the time of measuring the diffuse reflectance, the opposite side surface is covered with a blackout curtain, in order not to let light enter into the image projecting structure from the surface side on the opposite side to the surface side of the object to be measured. Further, an aperture with approximately the same degree as the diameter of incident light is set in close contact with the object to be measured. Based on JIS K5602, the spectral diffuse reflectance at a wavelength of from 300 to 1,280 nm is measured, and in accordance with JIS R3106, a visible light reflectance due to spectral luminous efficiency of CIE light adaptation, to CIE standard light D65 as specified in JIS Z8720, is obtained.

The autocorrelation length Sal of irregularities, the vertical difference Sk in the core section, the kurtosis Sku, and the height of protruding peak Spk, are values calculated from the three-dimensional surface roughness profile obtained by measuring an area of 130 µm square by the method described in the International Standards Organization (ISO International Organization for Standardization) 25178.

The visible light transmittance, the haze and the diffuse reflectance are values measured at room temperature by using D65 light source of CIE standards prescribed in ISO/CIE 10526 (or JIS Z8720 (2012)) as a light source.

Hereinafter, also at the time of describing the shape of a preferred image projecting structure 100, in addition to those mentioned above, three-dimensional surface shape parameters defined by ISO 25178 will be used. The main three-dimensional surface shape parameters are shown in Table 1 below. In the three-dimensional surface roughness parameters, Sp, Sv, Sz, Sa, Sq and Sal are ones having Rp, Rv, Rz, Ra, Rq and RSm in the two-dimensional surface roughness parameters extended to three dimensions.

TABLE 1

| | |
|---|---|
| Sq | Root-mean-square |
| Ssk | Skewness (deviation) |
| Sku | Kurtosis |
| Sp | Maximum peak height |
| Sv | Maximum pit depth |
| Sz | Maximum surface irregularity height (Sp + Sv) |
| Sa | Arithmetic mean |
| Sk | Vertical difference in the core section |
| Spk | Height of protruding peak |
| Svk | Height of protruding valley |
| SMr1 | Load area ratio separating the protruding peak and the core section |
| SMr2 | Load area ratio separating the protruding valley and the core section |
| Sxp | Load area ratio of from 97.5% to 50% |
| Vvv | Void volume of the valley (load area ratio of 80%) |
| Vvc | Void volume of the core section (load area ratio of from 10% to 80%) |
| Vmp | Material volume of the peak (load area ratio of 10%) |
| Vmc | Material volume of the core section (load area ratio of from 10% to 80%) |
| Sal | Shortest autocorrelation length |
| Str | Texture aspect ratio |

Now, embodiments of the present invention will be described with reference to the drawings.

FIG. 1 is an explanatory view showing the structure of an image projecting structure according to the present invention. In FIG. 1, one cross-section of the image projecting structure illustrated. As shown in FIG. 1, the image projecting structure 100 comprises a transparent substrate 10, a first transparent layer 21 formed on the transparent substrate 10 and having fine irregularities formed on its surface, a reflective film 30 formed on the surface on which the irregularities are formed, of the first transparent layer, and a second transparent layer 22 formed on the reflective film 30. The second transparent layer 22 is formed on the reflective film 30, so as to fill the irregularities.

The transparent substrate 10 is, for example, glass or a transparent resin. In the case of using glass as the transparent substrate 10, it is preferred to use soda lime glass or alkali-free glass. The glass may be one subjected to chemical strengthening, hard coating, etc. in order to improve the durability. In the case of using a transparent resin as the transparent substrate 10, it is preferred to use a polycarbonate resin, a polyethylene terephthalate resin, a polyethylene naphthalate resin, a cycloolefin polymer, etc. The transparent substrate 10 is preferably one having no birefringence.

As the transparent substrate 10, it is possible to select one with such a thickness that the durability as a substrate can be maintained. The thickness of the transparent substrate 10 is preferably at least 0.01 mm, more preferably at least 0.05 mm, further preferably at least 0.1 mm. Further, it is preferably at most 10 mm, more preferably at most 5 mm, further preferably at most 0.5 mm. It is particularly preferably at most 0.3 mm, further preferably at most 0.15 mm.

The first transparent layer 21 is preferably a transparent resin layer. As the transparent resin, an acrylic resin, an epoxy resin, a polycarbonate resin, a silicone resin, an unsaturated polyester resin, etc. may be mentioned. The above resin is preferably one type of a photocurable resin, a thermosetting resin and a thermoplastic resin. In a case where an image projecting structure 100 is formed in a window provided in a room, etc., the yellow index of the transparent resin is preferably at most 10, more preferably at most 5, in order to maintain clarity so as not to lose the function as a window. The transmittance of the first transparent layer 21 is preferably at least 50%, more preferably at least 75%, further preferably at least 90%.

The second transparent layer 22 is preferably a transparent resin layer. The transparent resin may be the same as the transparent resin in the first transparent layer 21. The second transparent layer 22 may be formed of the same material as the first transparent layer 21 or a different material, but is preferably formed of the same material. In the same manner as in the case of the first transparent layer 21, the transmittance of the second transparent layer 22 is preferably at least 50%, more preferably at least 75%, further preferably at least 90%.

In the first transparent layer 21 and the second transparent layer 22, the thickness other than the irregularity portion is, for example, at least 0.5 µm and at most 50 µm.

The reflective film 30 may be formed by a metal film or a single-layered or multilayered film of dielectric material, or a combination thereof. A part of light incident on the reflective film 30 is transmitted therethrough, and the other part is reflected. The reflective film 30 is preferably formed of at least one material selected from the group consisting of a metal, a metal oxide, a metal nitride and a semiconductor. The reflective film 30 is more preferably formed of a metal material containing aluminum (Al) or silver (Ag). As an example, the reflective film 30 is a thin metal film, or a multilayered film having an oxide film, a thin metal film and an oxide film sequentially stacked in this order. The oxide film means a film of an oxide of metal or semiconductor. The thickness of the metal thin film is preferably from 1 to 100 nm, more preferably from 4 to 25 nm. Within such a range, it is possible to utilize the preferred functions as reflective film as described above without interfering with the functions by irregularities formed on the surface of the first transparent layer 21.

The effects of irregularities formed on the surface of the first transparent layer 21 of the present invention will be described.

Light incident on a smooth surface (projection surface) does not substantially diffuse, whereby the regular reflectance is large, and the reflected light intensity rapidly diminishes if the angle is deviated from the regular reflection angle. In order to increase the reflected light intensity and to widen the viewing angle, irrespective of the place in the image projecting structure 100 or the position angle of the observer, it is preferred that the angle of the irregularity surface of the first transparent layer 21 on which the reflective layer 30 is formed, to the surface of the transparent substrate 10, varies.

For example, the angle to the surface of the transparent substrate 10 is preferably formed by a surface of such a shape as a smooth sine curve.

Otherwise, even if the angle may not vary smoothly, if angles of the respective faces constituting irregularities to the surface of the substrate 10, are various angles in 360°, and more specifically, if the assembly of angles of the respective faces includes substantially all angles in 360°, the angles of diffuse reflected lights include all angles. However, in practice, all angles in the 360° are discrete angles (e.g. angles discretely distributed every 2°).

However, if the degree of multiple reflection at the irregularity surface increases for such a reason that irregularities are large, the haze increases, and the reflected light is thereby attenuated. As a result, visibility of the image is reduced at the projection surface. Therefore, the irregularity surface is required to be formed not only to present various angles, but also to have a shape controlled so that the multiple reflection be suppressed.

The transmittance of visible light required for an image projecting structure 100 as a reflection type screen capable of observing an image on the rear surface is at least 5% where the presence of background is visible, and at most 95% where a projected image is visible. Further, in order to obtain higher visibility of a transmitted background view and high image visibility, and in order to obtain higher image visibility, the transmittance of visible light is more preferably from 20 to 80%. Furthermore, in order to let the function as a window to transmit a background view be exhibited sufficiently and to obtain higher image visibility, the transmittance of visible light is more preferably from 40 to 80%. The transmittance of visible light can be adjusted by changing the material of the reflective film 30 or by changing the thickness of the reflective film 30.

Further, from such a viewpoint that in order to obtain higher image visibility, it is preferred that diffuse reflectance is higher, and at the same time, the haze is lower, the value obtained by dividing the haze by the diffuse reflectance of visible light (hereinafter referred to also as the haze/Rv) is at least 0.1 and at most 1, preferably at least 0.1 and at most 0.5, more preferably at least 0.1 and at most 0.3. Within this range, the visibility of a background view and a projected image can be made good.

Further, the vertical difference Sk in the core section (hereinafter referred to also as Sk) is at least 0.1 µm. Sk represents the vertical difference in the irregular core section and is a parameter relating to the amplitude in the vertical direction of the substrate. The smaller the Sk, the finer the irregularities in the vertical direction of the substrate, and the larger the Sk, the larger the amplitude, thus indicating a rough shape. With a smooth surface having no irregularities, Sk is infinitesimal (close to 0), and the viewing angle becomes to be narrow. When it is taken into consideration that the wavelength of visible light is from 0.38 µm to 0.78 µm, Sk is required to be at least 0.1 µm. As the Sk value becomes large, the viewing angle tends to be wide. The upper limit of Sk may be determined by the relation to the shortest autocorrelation length Sal, but it is preferably at most 20, more preferably at most 10, in order to control the haze to be within a range not to be too large.

Further, with respect to irregularities on the above surface, the value obtained by dividing the shortest autocorrelation length Sal (hereinafter referred to also as Sal) by Sk as defined by ISO 25178 (hereinafter referred to also as Sal/Sk) is at least 1.2 and at most 190. The lower limit of Sal/Sk is preferably 1.5, and the upper limit of Sal/Sk is preferably 95, more preferably 12. The range of Sal/Sk is preferably at least 1.5 and at most 190, more preferably at least 1.5 and at most 95, further preferably at least 1.5 and at most 12. The shortest autocorrelation length Sal represents the shortest autocorrelation length, and it is a parameter relating to the period in the substrate in-plane direction. The smaller the value of Sal, the finer the irregularity shape in the substrate in-plane direction, and thus, multiple scattering increases, and the haze tends to increase. The larger the value of Sal, the longer the periodic shape in the substrate in-plane direction, and thus, multiple scattering decreases, and the haze tends to decrease. Sk is a parameter obtained by three-dimensionally extending a lubricity evaluation parameter Rk of a plateau-structure surface as a roughness (two-dimensional) parameter, and represents the difference between the upper limit level and the lower limit level at the core section of the irregularities.

Sal/Sk is a value relating to the aspect ratio of the irregularity cross-sectional shape, and when it is in the above-mentioned range, a wide viewing angle can be secured, while maintaining a low haze.

In the case of evaluating the irregularities of the surface shape of the first transparent layer 21, specifically, in the case of counting the number of inflection points in the two-dimensional cross-sectional profile in one cross section perpendicular to the surface of the substrate 10, the number of inflection points per 10 µm is preferably at least 0.1 and at most 28, more preferably at least 1 and at most 20. Within this range, the haze can be adjusted to be within an appropriate range, and visibility of a projected image will be good.

Kurtosis Sku (hereinafter referred to also as Sku) is a parameter obtained by three-dimensionally extending roughness curve kurtosis Rku as a roughness (two-dimensional) parameter, and represents the kurtosis (sharpness) of the height distribution. When Sku=3, the surface irregularities show a normal distribution, when Sku<3, they show such a shape that the height distribution of the surface irregularities has been collapsed, and when Sku>3, the height distribution is sharp. Surface irregularities of the first transparent layer 21 of the present invention may have such a shape that these irregularities are combined.

In the case of irregularities where Sku is at most 3.5, the vertical difference Sk in the core section is preferably at least 0.1 μm, and Sal/Sk is preferably at least 1.2 and at most 190, more preferably at least 1.5 and at most 190. Within this range, it is especially easy to make the image projecting structure to have a wide viewing angle, while maintaining a low haze.

In the case of irregularities where kurtosis Sku of the irregularities exceeds 3.5, the height distribution is sharper than the normal distribution, and sharp irregularities are many. In the case of irregularities where Sku exceeds 3.5, it is preferred that the vertical difference Sk in the core section is at least 0.1 μm, Spk is at least 0.01 μm and at most 3 μm, and Sal/Sk is at least 3 and at most 190. Within this range, it is easy to make the image projecting structure to have a wide viewing angle, while maintaining a low haze.

The height of protruding peak Spk is a parameter obtained by three-dimensionally extending a lubricity evaluation parameter Rpk of a plateau-structure surface as a roughness (two-dimensional) parameter, and represents the average height of protruding peak above the core section. Here, in the relation to an index Svk for the average depth of the protruding valley sections below the core section, as a parameter obtained by three-dimensionally extending a lubricity evaluation parameter Rvk of a plateau-structure surface as a roughness (two-dimensional) parameter, the sum of Spk, Sk and Svk becomes the height from the valley to the peak of the irregular structure.

Figure 24:
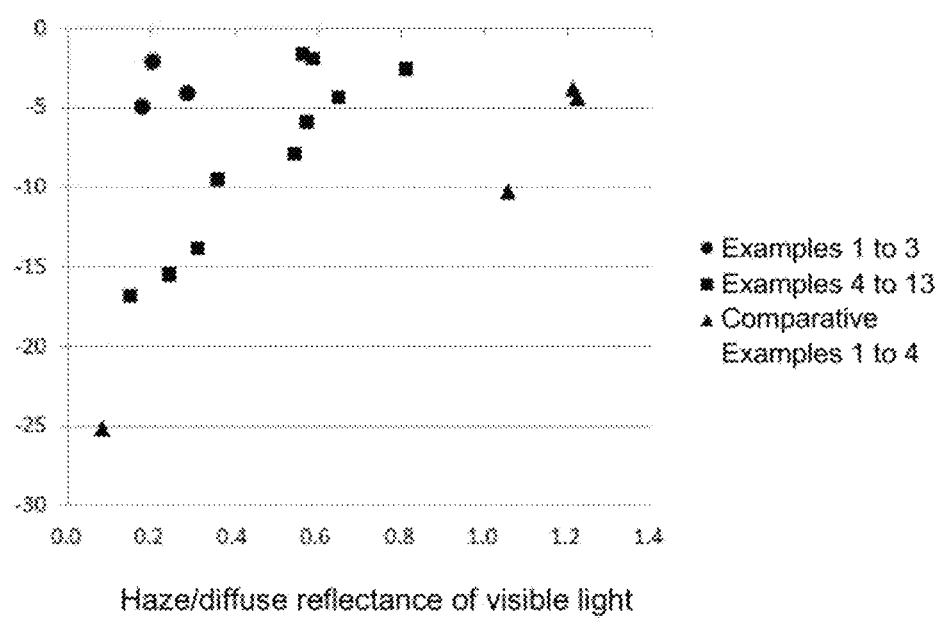
FIG. 24 is an explanatory diagram showing the relationship between the value obtained by dividing the haze by the diffuse reflectance of visible light, and the lamp reflection intensity attenuation rate.
Figure 27A:
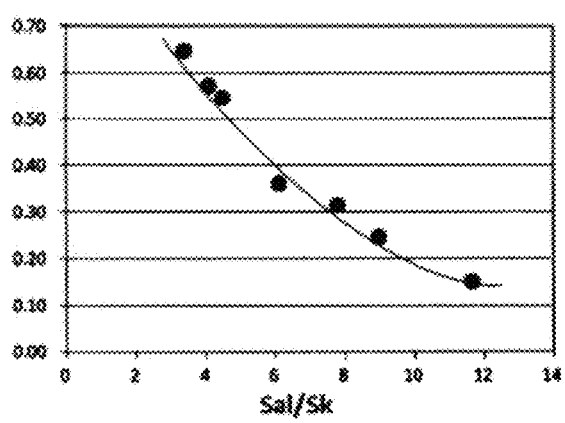
FIGS. 27A and 27B are each an explanatory diagram showing the relationship between the value obtained by dividing the shortest autocorrelation length Sal by the vertical difference Sk in the core section, and the value obtained by dividing the haze by the diffuse reflectance of visible light, or the lamp reflection intensity attenuation rate in the case of Examples 4 to 10.
Figure 27B:
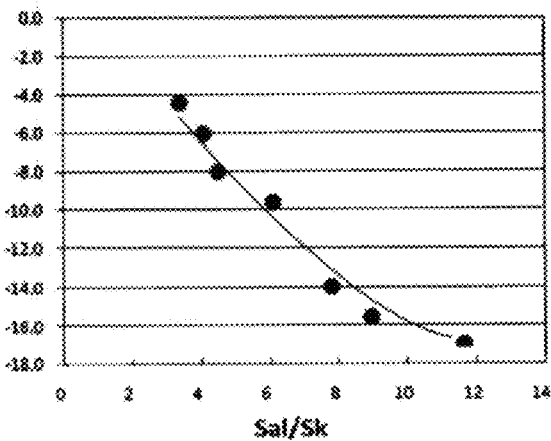

In the case of irregularities where kurtosis Sku of the irregularities exceeds 3.5, the conditions for lowering the absolute value of the attenuation rate of lamp reflected light intensity, and the conditions for obtaining a lower haze, tend to show a trade-off relation. In a case where Sal/Sk is larger, i.e. in a case where the ratio of the Sal value as a parameter relating to the period in the substrate in-plane direction to the Sk value as a parameter relating to the amplitude in the vertical direction to the substrate, is larger, although increase of the haze will be suppressed, the absolute value of the attenuation rate of lamp reflected light intensity tends to become a larger value. In a case where the ratio of the Sal value to the Sk value is a smaller value, i.e. as the amplitude in the vertical direction to the substrate increases to the period in the substrate in-plane direction, the absolute value of the attenuation rate of lamp reflected light intensity is more reduced and the viewing angle is enlarged, but the haze will increase (FIGS. 27A and 27B, FIG. 24). Therefore, in a case where Sku exceeds 3.5, Sal/Sk is preferably at least 3 and at most 12; especially in a case where a low haze is of importance, the Sal/Sk ratio is preferably at least 8 and at most 12; especially in a case where a wide viewing angle is of importance, the Sal/Sk ratio is preferably at least 3 and at most 5; and in a case where both characteristics of low haze and wide viewing angle are of importance, the Sal/Sk ratio is at least 5 and at most 8. Further, in a case where Sku exceeds 3.5, along with an increase of Sq and Sa, the absolute value of the attenuation rate of lamp reflected light intensity tends to decrease i.e. the viewing angle tends to increase, but the value of haze/Rv tends to increase, and thus, there is a tendency of trade-off.

The arithmetic mean height Sa is preferably at least 0.1 μm and at most 20 μm, more preferably at least 0.3 μm and at most 10 μm. By adjusting it to be within this range, it is possible to further lower the haze and widen the viewing angle.

The root mean square height Sq is preferably at least 0.1 μm and at most 10 μm. By adjusting it to be within this range, it is possible to further widen the viewing angle.

Along with an increase of Sq and/or Sa, the absolute value of the attenuation rate of lamp reflected light intensity tends to decrease i.e. the viewing angle tends to increase.

In order to improve the viewing angle to be widened, the lamp reflection intensity attenuation rate is preferably at most −20 dB (by absolute value).

Spk is the height of protruding peak, i.e. the average height of protruding peak above the core section. In the case of a surface shape with many sharp irregularities where Sku exceeds 3.5, an increase in Spk leads to an increase in multiple scattering to increase the haze. With a view to obtaining a low haze, the Spk value in the case where Sku exceeds 3.5, is preferably at most 3 μm, more preferably at most 1 μm. The maximum peak (top) height Sp value is considered to generally correlate with the Spk value.

The Svk value is the height of the protruding valley, i.e. the average height of the protruding valley below the core section.

The relationship of the load area ratio SMr1 to separate the protruding peak and the core section, the load area ratio SMr2 to separate the protruding valley sections and the core section, Spk, Sk, and Svk, will be described with reference to a load curve (the topmost portion: 0%, the lowest valley section: 100%) relating to the probability density in the depth direction of all the measurement points.

In the load curve (the topmost portion: 0%, the lowest valley portion: 100%) relating to the probability density in the depth direction of all the measurement points, the load area ratio SMr1 separating the protruding peak and the core section is a load area ratio which separates the protruding peak and the core section, and the load area ratio SMr2 separating the protruding valley sections and the core section is a load area ratio which separates the protruding valley sections and the core section. That is, the larger the value of SMr1, the larger the proportion of the protruding peak, and the larger the value of SMr2, the smaller the proportion of the protruding valley sections. In irregularities with similar shapes where Sku takes comparable values, the Spk value and the SMr1 value show generally similar behavior (in the case of an increase of Spk, SMr1 increases), and the Svk value and the SMr2 value show the opposite behavior (in the case of an increase of Svk, SMr2 decreases).

Figure 2:
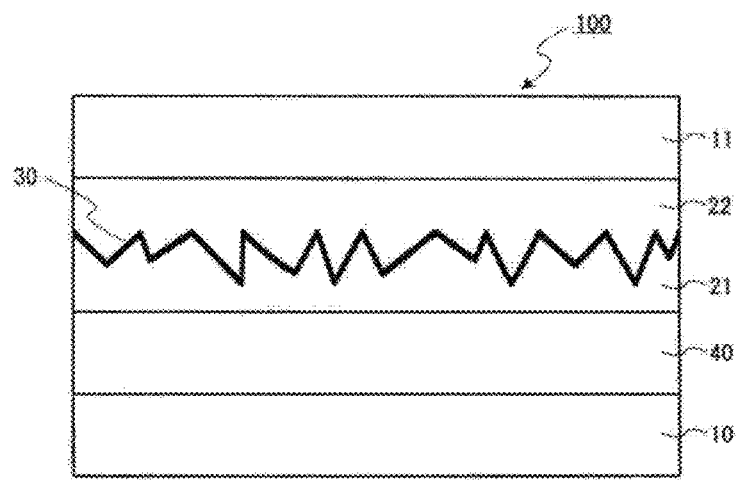
FIG. 2 is a cross-sectional view showing another example of the structure of an image projecting structure of the present invention.

FIG. 2 is a cross-sectional view of an image projecting structure 100 of another example of the structure of the image projecting structure of the present invention. As shown in FIG. 2, on a transparent film 40, a first transparent layer 21, a reflective film 30, and a second transparent layer 22 are formed, and a transparent substrate 10 is bonded to the transparent film 40 side, and a transparent substrate 11 is bonded to the second transparent layer 22 side. In this structure, without forming a first transparent layer 21 directly on the transparent substrate 10 formed of glass or the like, the first transparent layer 21, the reflective film 30 and the second transparent layer 22 are on the transparent film 40. Therefore, it is possible to produce an image projecting structure by a low-cost manufacturing method such as roll-to-roll. In FIG. 2, the transparent film 40 and the transparent substrate 10 are presented as separate members for convenience sake, but the transparent film 40 can be regarded as an embodiment of the transparent substrate 10. Thus, the transparent film 40 may be made of the same material as described in the transparent substrate 10.

Figure 3:
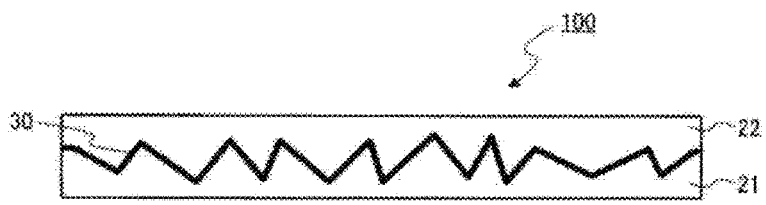
FIG. 3 is a cross-sectional view showing another example of the structure of an image projecting structure of the present invention.

FIG. 3 is a cross-sectional view of an image projecting structure 100 of another example of the structure of the image projecting structure of the present invention. As shown in FIG. 3, it is a structure constituted solely by a first transparent layer 21, a reflective layer 30 and the second transparent layer 22. Even if the transparent substrate 10 and transparent substrate 11 are not present, so long as the surface shape of the irregularities formed on the surface of the first transparent layer 21 has such characteristics as exemplified in the following Examples 1 to 10, and the image projecting structure 100 constituted by the first transparent layer 21, the reflective layer 30 and the second transparent layer 22 has such optical characteristics as exemplified in the following Examples 1 to 10, the viewing angle will be wide, and it is possible to improve the visibility of the entire projection surface.

Figure 4:
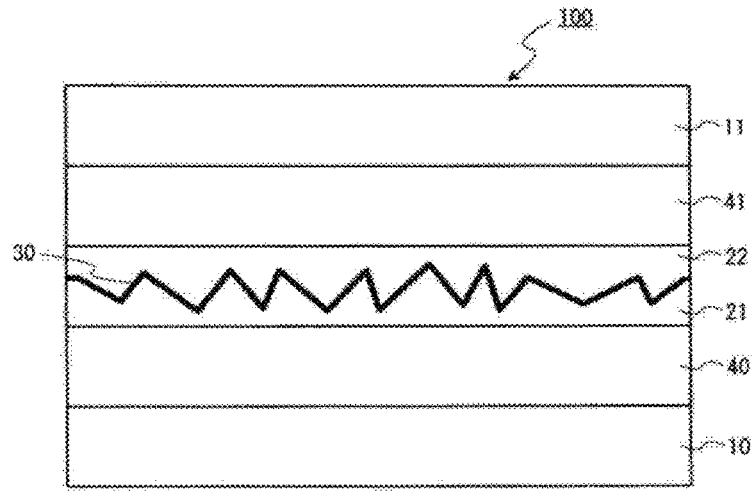
FIG. 4 is a cross-sectional view showing another example of the structure of an image projecting structure in an embodiment of the present invention.

FIG. 4 is a cross-sectional view of an image projecting structure 100 of another example of the structure of the image projecting structure of the present invention. As shown in FIG. 4, it is a structure wherein on a first transparent film 40, a first transparent layer 21, a reflective film 30 and a second transparent layer 22 are formed, on the second transparent layer 22, a second transparent film 41 is bonded, a first transparent substrate 10 is bonded on the first transparent film 40 side, and a second transparent substrate 11 is bonded to the second transparent film 41 side. In this structure, the layered member made of the first transparent film 40, the first transparent layer 21, the reflective film 30, the second transparent layer 22, and the second transparent film 41, is easy to handle. Further, when the second transparent film is bonded on the second transparent layer 22 prior to photocuring the second transparent layer 22, it will be easy to promote curing of the second transparent layer 22.

Method for Producing Image Projecting Structure

An example of the method for producing an image projecting structure 100 will be described. FIGS. 5A, 5B, 6A and 6B are sectional views showing the method for producing an image projecting structure 100.

Figure 5A:
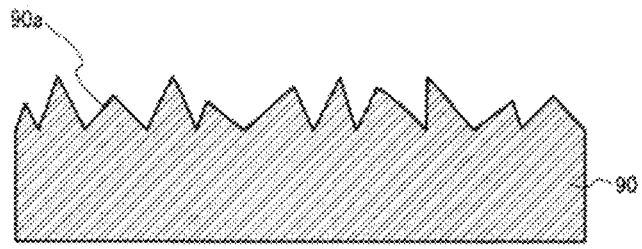
FIGS. 5A and 5B are each a cross-sectional view showing a method for producing an image projecting structure.

As shown in FIG. 5A, a mold 90 having irregularities 90a formed on its surface, is prepared. The mold 90 is, for example, a resin film having irregularities formed on the surface, but it may be one having its surface matted with a white or black film, one having a luster, a release film, or a mold die having irregularities formed on its surface. A film having irregularities formed on its surface, is preferably one not subjected to easy adhesion treatment. A mold die or film having irregularities formed on its surface, is, for example, one obtained by grinding the surface of the material on which irregularities are to be formed, one having the surface molded by dry etching, wet etching, sandblasting or extrusion molding, one utilizing a surface structure formed by molding a mixed material such as microparticles, or one having irregularities formed by e.g. coating of the self-organizing material. The material for the mold die is, for example, a Ni based material, stainless steel, Cu-based material, quartz, glass or the like. The formed irregularity surface may be one subjected to release treatment. Further, in the three-dimensional shape of the irregularity surface at the surface of the irregularity surface 90a of the mold 90, by properly selecting a preferred mold 90, it is possible to adjust Sal, Sk, Spk, Sa, Sal/Sk and Sq of the surface shape of the first transparent layer 21.

Figure 5B:
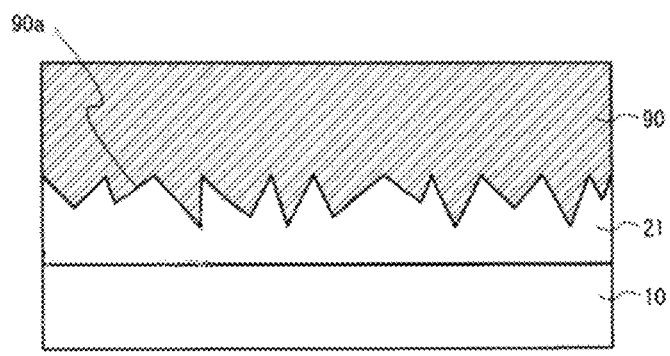

Next, a transparent substrate 10 such as a glass substrate is prepared, and on the transparent substrate 10, a UV-curable resin (ultraviolet curable resin) being a resin material for forming a first transparent layer 21, is applied by die coating, spin coating, inkjet coating, spray coating, etc. Then, as shown in FIG. 5B, the mold 90 is placed onto the UV curable resin applied on the transparent substrate 10. The mold 90 is placed so that the surface having irregularities 90a formed, of the mold 90, will be put on the UV curable resin. Thereafter, the UV curable resin is cured by irradiation with UV light (ultraviolet light) of from 200 to 10,000 mJ to form the first transparent layer 21. In a case where the first transparent layer 21 is to be formed of a thermosetting resin, after placing the mold 90 on the thermosetting resin, the thermosetting resin is cured by heating. Otherwise, in a case where the first transparent layer 21 is to be formed of a thermoplastic resin, the thermoplastic resin is heated and the mold 90 is placed, followed by cooling to solidify the thermoplastic resin.

Then, the mold 90 is peeled from the first transparent layer 21. As a result, the surface of irregularities formed on the surface of the first transparent layer 21 is exposed.

Figure 6A:
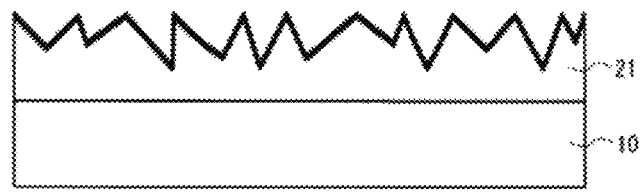
FIGS. 6A and 6B are each a cross-sectional view showing a method for producing an image projecting structure.

Then, as shown in FIG. 6A, a reflective film 30 is formed on the surface on which the irregularities are formed, of the first transparent layer 21. The reflective film 30 is formed by depositing e.g. an Al film by vacuum deposition or sputtering on the surface on which the irregularities are formed.

The reflective film 30 is formed so that the reflectance would be preferably at least 5%, preferably at least 15%, further preferably at least 30%. The reflective film 30 is preferably such that the reflectance is not abruptly changed by the color. When the typical light wavelengths of RGB are considered to be 630 nm, 530 nm and 465 nm, respectively, the ratio of the respective reflectance Log (common logarithm) values is preferably within a range of from 0.5 to 2.

Figure 6B:
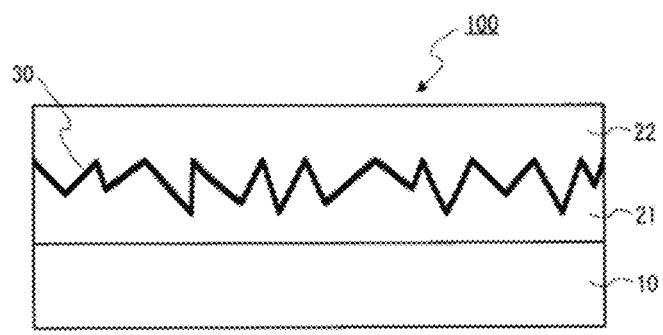

Then, as shown in FIG. 6B, on the reflective film 30, a second transparent layer 22 is formed. Specifically, on the reflective film 30, a UV curable resin (ultraviolet curable resin) for forming the second transparent layer 22 is applied by die coating. Thereafter, the UV curable resin is irradiated with UV light (ultraviolet light) and cured to form the second transparent layer 22. Here, the second transparent layer 22 may be formed of a thermosetting resin or a thermoplastic resin.

In the first transparent layer 21 and the second transparent layer 22, the thickness other than the irregularity section may be at least 0.5 μm, but in consideration of a roll-to-roll process to be used for its production, it is preferably at most 50 μm. Further, it is preferably less than twice the Ra (arithmetic average roughness) of irregularities, whereby it is possible to reduce costs by reducing the amounts of the resins, while securing a sufficient thickness to inhibit e.g. shrinkage during molding.

EXAMPLES

Hereinafter, Examples and Comparative Examples will be described.

In each of Examples and Comparative Examples described below, a polyethylene terephthalate resin film (0.1 mm thick) was used as a transparent film, and a UV curable resin OGSOL (registered trademark) EA-F5003 (manufactured by Osaka Gas Chemicals Co., Ltd.) was used as a photocurable resin.

The surface shape of the irregularity surface (specifically, the three-dimensional surface shape parameters) was measured by using a confocal laser microscope (manufactured by OLYMPUS CORPORATION, laser microscope LEXT OLS4000), and the cutoff value was set to be 80 μm.

Further, the optical characteristics (visible light transmittance, haze, visible light reflectance, etc.) of the image projecting structure 100 prepared, were measured by using a D65 light source.

As a method for comparing the wideness of the reflection viewing angle of the prepared image projecting window, a method was employed wherein by irradiating the image projecting window with light of a high-intensity light source (ultra-high pressure mercury lamp, etc.), the reflected light intensity was measured by means of a spectroradiometer (e.g. CS-1000 manufactured by Konica Minolta) while changing the detection angle. That is, light is incident from the direction normal to the image projecting window, and the intensity of light reflected by the window and backscattered is measured by changing the detection angle from 5° to 70° (the direction normal to the image projecting window being 0°, and the direction parallel to the window being 90°). Also with respect to a white calibration plate, the reflected light intensity was measured by changing the detection angle in the same manner, and at each detection angle, the reflected light intensity relative value by the image projecting window was obtained based on the reflected light intensity by the white calibration plate being 1. Further, the attenuation rate calculated from the reflected light intensity relative values at the detection angles of 70° and 5° ($10 \log_{10}$ (the reflected light intensity relative value at the detection angle of 70°/the reflected light intensity relative value at the detection angle of 5°)) was adopted as the lamp reflected light intensity attenuation rate (dB).

In the following Examples and Comparative Examples, on the assumption of an image projecting structure 100 being a structure to be used in a window provided in a room, etc., the image projecting structure 100 is represented by an image projecting window. However, the image projecting structure 100 in the following Examples is not limited to an image projecting window.

Example 1

On the polyethylene terephthalate resin film, the UV curable resin was applied by die coating, and the mold 90 was placed thereon. The mold 90 was placed so that the surface having irregularities 90a formed, was located on the UV curable resin, and UV light of 1,000 mJ was irradiated from the side of the mold 90 to cure the UV curable resin. The mold 90 was peeled, and the surface shape of the irregularity surface was measured. Then, on the irregularity surface, an Ag film was formed in a thickness of 12 nm by a sputtering method. On the Ag film, the UV curable resin was applied by die coating, and UV light of 1,000 mJ was irradiated from the side of the UV curable resin to cure the UV curable resin.

Figure 7A:
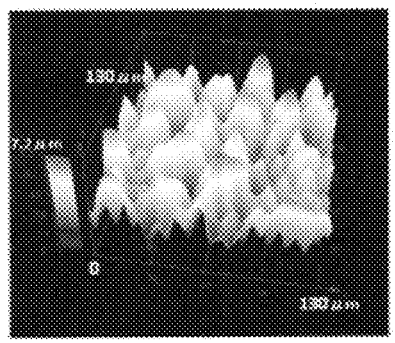
FIGS. 7A-7C are explanatory views showing the three-dimensional shape of the irregularity surface of the first transparent layer in Example 1, the two-dimensional cross-sectional profile in one cross section and the load curve.
Figure 7B:
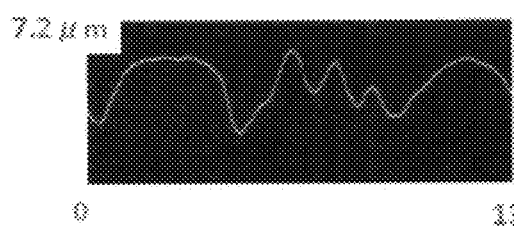
Figure 7C:
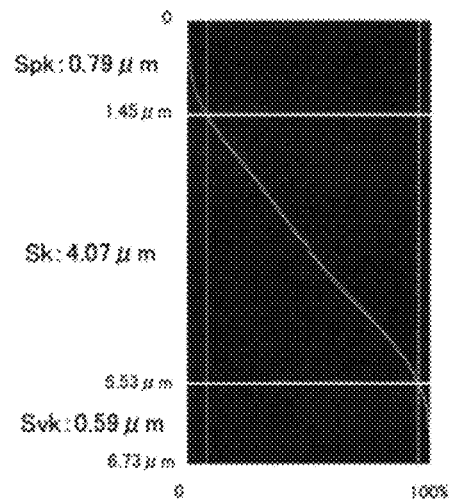

FIGS. 7A, 7B and 7C are explanatory views showing A: the three-dimensional shape of the irregularity surface of the first transparent layer 21 at a part of the image projecting window in Example 1, B: the two-dimensional surface shape (two dimensional cross-sectional profile) in one cross section perpendicular to the surface of the substrate 10, and C: the load curve.

Here, in FIG. 7A, the three-dimensional shape of the irregularity surface of the first transparent layer 21 is shown. Further, in Example 1, the mold 90 with a transfer surface capable of forming irregularities as shown in FIG. 7A was used.

Table 2 and Table 3 show the measured three-dimensional surface shape parameters of a 130 μm square. Table 2 also shows the measured optical characteristics (transmittance of visible light, haze, and diffuse reflectance of visible light (Rv)). Table 2 further shows the lamp reflected light intensity attenuation rate. The lamp reflected light intensity attenuation rate will be described later. Table 2 shows the number of inflection points per 10 μm in the two-dimensional cross-sectional profile. Table 2 shows, together with the number of inflection points per 10 μm, also the haze and the value obtained by dividing the haze by the diffuse reflectance of visible light. Further, in Table 2 and Table 3, except for Comparative Example 3, the second digit value below decimal point is rounded off.

Further, in Table 2 and Table 3, the three-dimensional surface shape parameters and optical characteristics, etc. in Examples 2 and 3 and Comparative Examples 1 to 3 are also shown.

TABLE 2

| | Sku | Spk [μm] | Sk [μm] | Sal [μm] | Sal/Sk | Transmittance of visible light [%] | Haze [%] | Diffuse reflectance of visible light Rv [%] | Haze/Rv | Lamp reflected light intensity attenuation rate [dB] | Number of inflection points per 10 μm [number/10 μm] |
|---|---|---|---|---|---|---|---|---|---|---|---|
| Example 1 | 2.1 | 0.8 | 4.1 | 11.9 | 2.9 | 49.0 | 5.0 | 28.4 | 0.18 | −4.9 | 3.89 |
| Example 2 | 3.1 | 0.6 | 2.4 | 7.8 | 3.2 | 44.9 | 6.1 | 21.3 | 0.29 | −4.1 | 16.3 |
| Example 3 | 3.0 | 6.9 | 8.2 | 16.9 | 2.1 | 51.2 | 1.7 | 8.4 | 0.20 | −2.1 | 15.2 |
| Comparative Example 1 | 4.0 | 3.5 | 4.3 | 9.9 | 2.3 | 45.5 | 19.3 | 18.2 | 1.06 | −10.2 | 30.4 |
| Comparaiive Example 2 | 2.4 | 3.2 | 10.0 | 10.5 | 1.1 | 40.5 | 17.7 | 14.5 | 1.22 | −4.3 | 29.8 |
| Comparative Example 3 | 152.0 | 0.02 | 0.04 | 8.0 | 204.9 | 51.1 | 2.8 | 33.5 | 0.08 | −25.1 | 0.05 |

TABLE 3

| | Sq [μm] | Ssk | Sp [μm] | Sv [μm] | Sz [μm] | Sa [μm] | Svk [μm] | SMr1 [%] | SMr2 [%] | Sxp [μm] | Vvv [μm³/μm²] | Vvc [μm³/μm²] | Vmp [μm³/μm²] | Vmc [μm³/μm²] | Str |
|---|---|---|---|---|---|---|---|---|---|---|---|---|---|---|---|
| Example 1 | 1.4 | 0.1 | 3.5 | 3.5 | 7.0 | 1.2 | 0.6 | 8.2 | 95.3 | 3.1 | 0.11 | 1.8 | 0.04 | 1.4 | 0.14 |
| Example 2 | 0.9 | −0.5 | 3.0 | 4.3 | 7.2 | 0.8 | 1.2 | 4.9 | 87.9 | 1.9 | 0.13 | 1.0 | 0.03 | 0.9 | 0.63 |

TABLE 3-continued

| | Sq [μm] | Ssk | Sp [μm] | Sv [μm] | Sz [μm] | Sa [μm] | Svk [μm] | SMr1 [%] | SMr2 [%] | Sxp [μm] | Vvv [μm³/μm²] | Vvc [μm³/μm²] | Vmp [μm³/μm²] | Vmc [μm³/μm²] | Str |
|---|---|---|---|---|---|---|---|---|---|---|---|---|---|---|---|
| Example 3 | 4.3 | 0.8 | 15.2 | 9.1 | 24.3 | 3.5 | 1.5 | 24.2 | 96.2 | 10.0 | 0.20 | 6.4 | 0.27 | 3.7 | 0.25 |
| Comparative Example 1 | 2.2 | 0.6 | 9.8 | 7.0 | 16.8 | 1.7 | 2.2 | 16.5 | 88.7 | 4.4 | 0.24 | 2.7 | 0.17 | 1.7 | 0.17 |
| Comparative Example 2 | 3.8 | 0.1 | 12.3 | 13.4 | 25.8 | 3.1 | 2.4 | 11.9 | 90.8 | 8.7 | 0.36 | 5.1 | 0.14 | 3.6 | 0.77 |
| Comparative Example 3 | 0.07 | −10.3 | 0.15 | 1.5 | 1.6 | 0.03 | 0.13 | 12.5 | 82.0 | 0.04 | 0.01 | 0.02 | 0.001 | 0.017 | 0.71 |

As shown in Table 2, the transmittance in the D65 light source was 49.0%, and the haze was 5.0%. Further, in order to examine the viewing angle of the reflection intensity of the prepared image projecting window, light was incident from the direction normal to the image projecting window, and the intensity of light reflected by the image projecting window and backscattered, was measured by changing the detection angle. The attenuation rate calculated from the reflection intensities at the detection angles of 70° and 5° (10 log$_{10}$ (reflection intensity at the detection angle of 70°/ reflection intensity at the detection angle of 5°): lamp reflected light intensity attenuation rate), based on the direction normal to the image projecting window being 0°, and the direction parallel to the image projecting window being 90°, was −4.9 dB.

That is, a small value was obtained as the haze, and a small value (a value close to 0 dB) was obtained as the lamp reflected light intensity attenuation rate. As a result, a low haze and a wide viewing angle were both attained, and good characteristics as an image projecting window were obtained.

Example 2

Figure 8A:
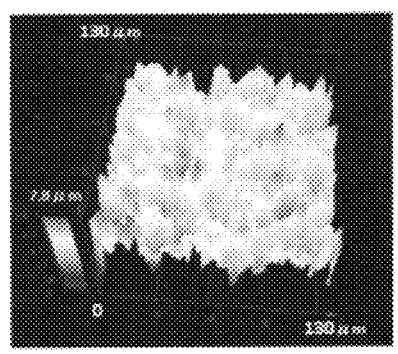
FIGS. 8A-8C are explanatory views showing the three-dimensional shape of the irregularity surface of the first transparent layer in Example 2, the two-dimensional cross-sectional profile in one cross section and the load curve.
Figure 8B:
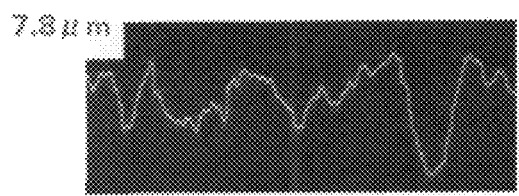
Figure 8C:
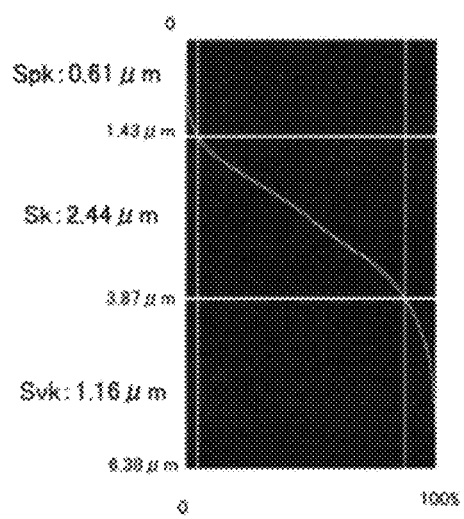

FIGS. 8A, 8B and 8C are explanatory views showing A: the three-dimensional shape of the irregularity surface of the first transparent layer 21 at a part of the image projecting window in Example 2, B: the two-dimensional surface shape (two dimensional cross-sectional profile) in one cross section perpendicular to the surface of the substrate 10, and C: the load curve. In Example 2, the mold 90 with a transfer surface capable of forming irregularities as shown in FIG. 8A was used.

As shown in Table 2, the transmittance in the D65 light source was 44.9%, and the haze was 6.1%. Further, the lamp reflected light intensity attenuation rate was −4.1 dB.

That is, a small value was obtained as the haze, and a small value (a value close to 0 dB) was obtained as the lamp reflected light intensity attenuation rate. As a result, a low haze and a wide viewing angle were both attained, and good characteristics as an image projecting window was obtained.

Example 3

FIG. 9 is an explanatory view showing a load curve of the three-dimensional shape of the irregularity surface of the first transparent layer 21 at a part of the image projecting window in Example 3.

As shown in Table 2, the transmittance in the D65 light source was 51.2%, and the haze was 1.7%. Further, the lamp reflected light intensity attenuation rate was −2.1 dB.

That is, a small value was obtained as the haze, and a small value (a value close to 0 dB) was obtained as the lamp reflected light intensity attenuation rate. As a result, a low haze and a wide viewing angle were both attained, and good characteristics as an image projecting window was obtained.

Comparative Example 1

FIGS. 10A, 10B and 10C are explanatory views showing A: the three-dimensional shape of the irregularity surface of the first transparent layer 21 at a part of the image projecting window in Comparative Example 1, B: the two-dimensional surface shape (two dimensional cross-sectional profile) in one cross section perpendicular to the surface of the substrate 10, and C: the load curve. In Comparative Example 1, the mold 90 with a transfer surface capable of forming irregularities as shown in FIG. 10A was used.

As shown in Table 2 and Table 3, and as can be seen from FIGS. 10A and 10B, the values of Spk and Svk are large.

As shown in Table 2, the transmittance in the D65 light source was 45.5%, and the haze was 19.3%. Further, the lamp reflected light intensity attenuation rate was −10.2 dB. As compared to Examples 1 and 2, the haze was large, and it was not possible to obtain good characteristics as an image projecting window.

Comparative Example 2

Figure 11A:
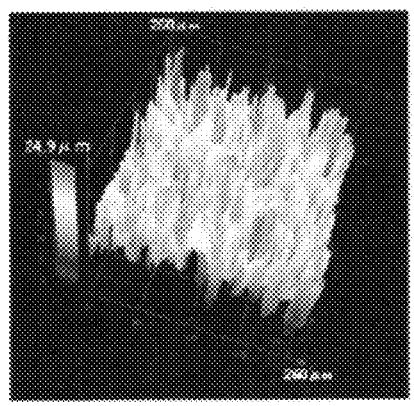
FIGS. 11A-11C are explanatory views showing the three-dimensional shape of the irregularity surface of the first transparent layer in Comparative Example 2, the two-dimensional cross-sectional profile in one cross section and the load curve.
Figure 11B:
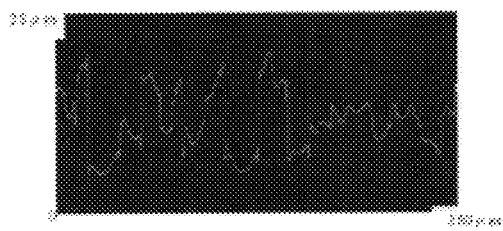
Figure 11C:
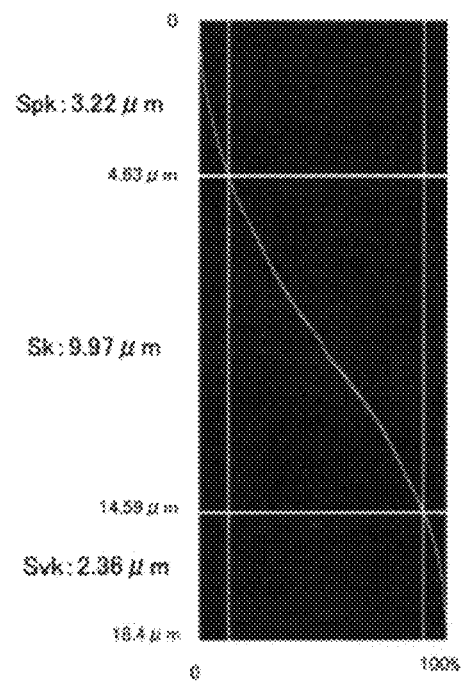

FIGS. 11A, 11B and 11C are explanatory views showing A: the three-dimensional shape of the irregularity surface of the first transparent layer 21 at a part of the image projecting window in Comparative Example 2, B: the two-dimensional surface shape (two dimensional cross-sectional profile) in one cross section perpendicular to the surface of the substrate 10, and C: the load curve. In Comparative Example 2, the mold 90 with a transfer surface capable of forming irregularities as shown in FIG. 11A was used.

As shown in Table 2 and Table 3, and as can be seen from FIGS. 11A and 11B, the values of Spk and Svk are large similarly to Comparative Example 1.

Further, as shown in Table 2, the transmittance in the D65 light source was 40.5%, the haze was 17.7%. Further, the lamp reflected light intensity attenuation rate was −4.3 dB. As compared to Example 1 and Example 2, the degree of the lamp reflected light intensity attenuation rate was not much different, but the haze was large, and it was not possible to obtain good characteristics as an image projecting window.

Comparative Example 3

Figure 12A:
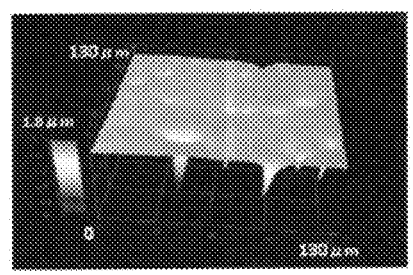
FIGS. 12A-12C are explanatory views showing the three-dimensional shape of the irregularity surface of the first transparent layer in Comparative Example 3, the two-dimensional cross-sectional profile in one cross section and the load curve.
Figure 12B:
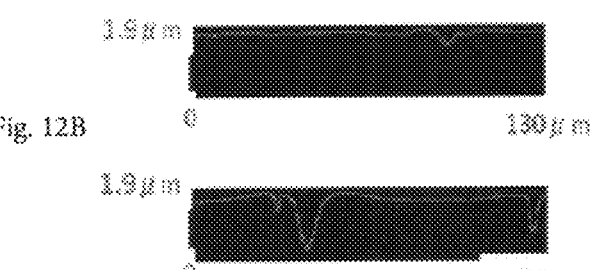
Figure 12C:
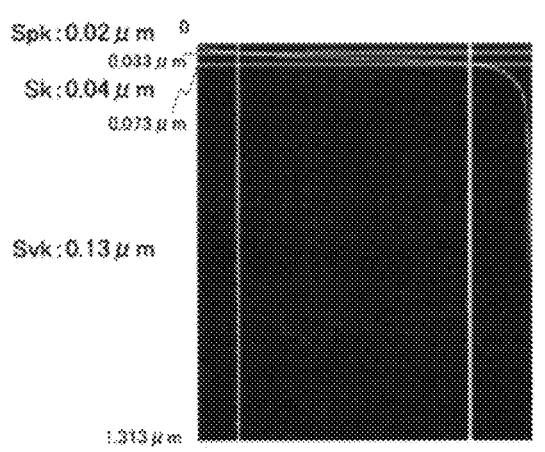

FIGS. 12A, 12B and 12C are explanatory views showing A: the three-dimensional shape of the irregularity surface of the first transparent layer 21 at a part of the image projecting window in Comparative Example 3, B: the two-dimensional surface shape (two dimensional cross-sectional profile) in two cross sections perpendicular to the surface of the substrate 10, and C: the load curve. In Comparative Example 3, the mold 90 with a transfer surface capable of forming irregularities as shown in FIG. 12A was used.

As shown in Table 2 and Table 3, and as can be seen from FIGS. 12A and 12B, the surface shape is substantially flat, but the value of kurtosis Sku is large.

Further, as shown in Table 2, the transmittance in the D65 light source was 51.1%, and the haze was 2.8%. Further, the lamp reflected light intensity attenuation rate was −25.1 dB. As compared to Example 1 and Example 2, the haze was small, but the lamp reflected light intensity attenuation rate was large, and it was not possible to obtain good characteristics as an image projecting window.

Example 4

Figure 13A:
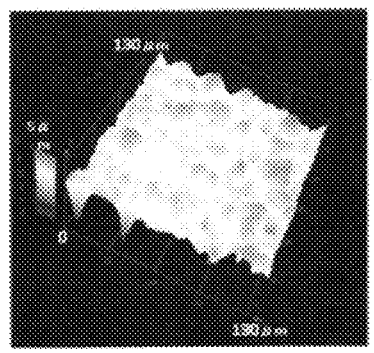
FIGS. 13A-13C are explanatory views showing the three-dimensional shape of the irregularity surface of the first transparent layer in Example 4, the two-dimensional cross-sectional profile in one cross section and the load curve.
Figure 13C:
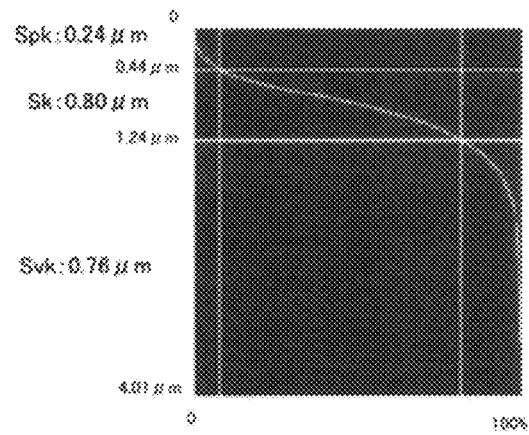
Figure 13B:
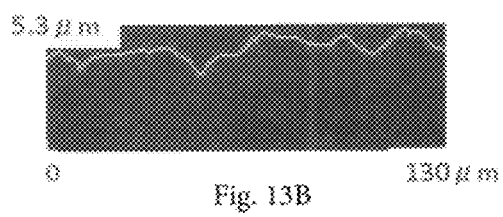

FIGS. 13A, 13B and 13C are explanatory views showing A: the three-dimensional shape of the irregularity surface of the first transparent layer 21 at a part of the image projecting window in Example 4, B: the two-dimensional surface shape (two dimensional cross-sectional profile) in one cross section perpendicular to the surface of the substrate 10, and C: the load curve. In Example 4, the mold 90 with a transfer surface capable of forming irregularities as shown in FIG. 13A was used.

In Table 4 and Table 5, the measured three-dimensional surface shape parameters are shown. In Table 4, the measured optical characteristics (transmittance of visible light, haze, and diffuse reflectance of visible light (Rv)) are also shown. In Table 4, the lamp reflected light intensity attenuation rate is also shown. In Table 4, the number of inflection points per 10 μm is shown. In Table 4, together with the number of inflection points, the haze and the value obtained by dividing the haze by the diffuse reflectance of visible light, are also shown.

Further, in Table 4 and Table 5, the three-dimensional surface shape parameters and the optical characteristics in Examples 5 to 10 are also shown.

As shown in Table 4, the transmittance in the D65 light source was 50.1%, and the haze was 5.0%. Further, the lamp reflected light intensity attenuation rate was −16.9 dB.

That is, a small value was obtained as the haze, and a value not large (a value close to 0 dB) was obtained as the lamp reflected light intensity attenuation rate. As a result, a low haze and a relatively wide viewing angle were both attained, and good characteristics as an image projecting window were obtained.

Example 5

Figure 14A:
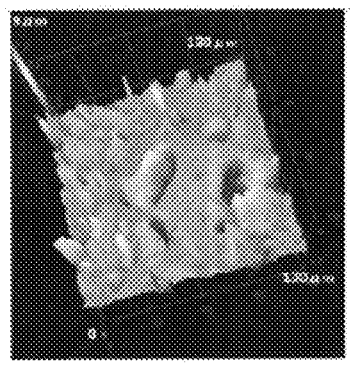
FIGS. 14A-14C are explanatory views showing the three-dimensional shape of the irregularity surface of the first transparent layer in Example 5, the two-dimensional cross-sectional profile in one cross section and the load curve.
Figure 14C:
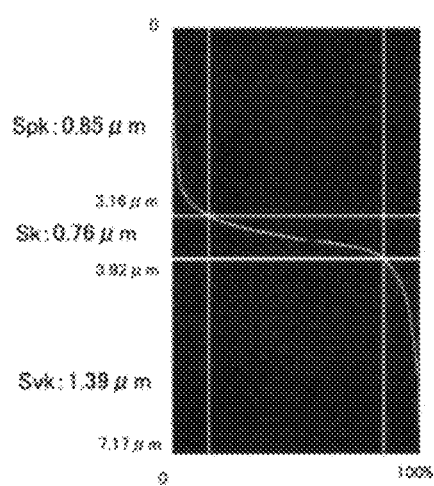
Figure 14B:
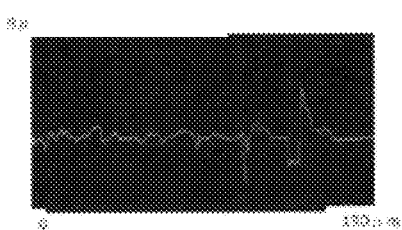

FIGS. 14A, 14B and 14C are explanatory views showing A: the three-dimensional shape of the irregularity surface of the first transparent layer 21 at a part of the image projecting window in Example 5, B: the two-dimensional surface shape (two dimensional cross-sectional profile) in one cross section perpendicular to the surface of the substrate 10, and C: the load curve. In Example 5, the mold 90 with a transfer surface capable of forming irregularities as shown in FIG. 14A was used.

As shown in Table 4, the transmittance in the D65 light source was 48.6%, and the haze was 6.5%. Further, the lamp reflected light intensity attenuation rate was −15.5 dB.

That is, a small value was obtained as the haze, and a value not large as the lamp reflected light intensity attenuation rate was obtained. As a result, a low haze and a relatively wide viewing angle were both attained, and good characteristics as an image projecting window were obtained.

Example 6

Figure 15A:
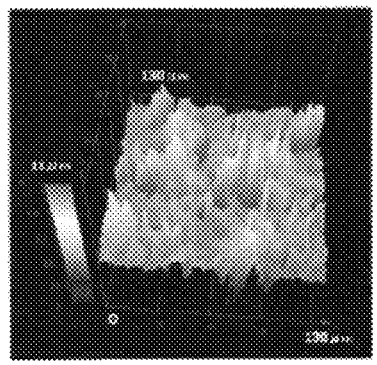
FIGS. 15A-15C are explanatory views showing the three-dimensional shape of the irregularity surface of the first transparent layer in Example 6, the two-dimensional cross-sectional profile in one cross section and the load curve.
Figure 15B:
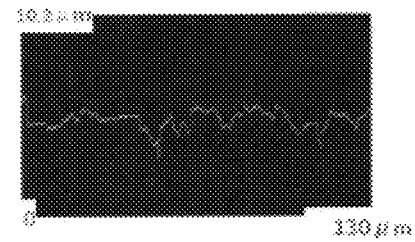
Figure 15C:
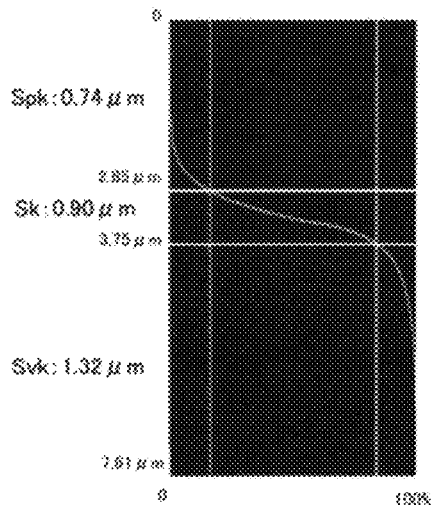

FIGS. 15A, 15B and 15C are explanatory views showing A: the three-dimensional shape of the irregularity surface of the first transparent layer 21 at a part of the image projecting window in Example 6, B: the two-dimensional surface shape (two dimensional cross-sectional profile) in one cross section perpendicular to the surface of the substrate 10, and C:

TABLE 4

|  | Sku | Spk [μm] | Sk [μm] | Sal [μm] | Sal/Sk | Transmittance of visible light [%] | Haze [%] | Diffuse reflectance of visible light Rv [%] | Haze/Rv | Lamp reflected light intensity attenuation rate [dB] | Number of inflection points per 10 μm [number/10 μm] |
|---|---|---|---|---|---|---|---|---|---|---|---|
| Example 4 | 9.5 | 0.2 | 0.8 | 9.3 | 11.6 | 50.1 | 5.0 | 33.0 | 0.15 | −16.9 | 1.16 |
| Example 5 | 10.3 | 0.8 | 0.8 | 6.8 | 8.9 | 48.6 | 6.5 | 26.3 | 0.25 | −15.5 | 10.8 |
| Example 6 | 9.9 | 0.7 | 0.9 | 7.0 | 7.8 | 47.5 | 8.2 | 26.0 | 0.32 | −14.0 | 14.7 |
| Example 7 | 7.0 | 0.8 | 1.1 | 6.8 | 6.1 | 45.9 | 8.2 | 22.6 | 0.36 | −9.6 | 18.4 |
| Example 8 | 4.8 | 1.0 | 1.6 | 6.5 | 4.1 | 44.9 | 11.5 | 21.0 | 0.55 | −8.0 | 21.4 |
| Example 9 | 4.8 | 0.9 | 1.5 | 6.9 | 4.5 | 39.7 | 11.9 | 20.7 | 0.57 | −6.0 | 22.8 |
| Example 10 | 4.5 | 1.0 | 2.0 | 6.6 | 3.4 | 40.3 | 13.0 | 20.0 | 0.65 | −4.4 | 24.3 |

TABLE 5

|  | Sq [μm] | Ssk | Sp [μm] | Sv [μm] | Sz [μm] | Sa [μm] | Svk [μm] | SMr1 [%] | SMr2 [%] | Sxp [μm] | Vvv [μm³/μm²] | Vvc [μm³/μm²] | Vmp [μm³/μm²] | Vmc [μm³/μm²] | Str |
|---|---|---|---|---|---|---|---|---|---|---|---|---|---|---|---|
| Example 4 | 0.4 | −1.8 | 1.0 | 3.5 | 4.5 | 0.3 | 0.8 | 8.0 | 81.7 | 0.7 | 0.08 | 0.38 | 0.01 | 0.35 | 0.77 |
| Example 5 | 0.6 | −0.8 | 5.0 | 3.9 | 9.0 | 0.4 | 1.4 | 14.9 | 85.6 | 0.8 | 0.12 | 0.47 | 0.05 | 0.29 | 0.17 |
| Example 6 | 0.7 | −1.1 | 5.5 | 4.8 | 10.3 | 0.4 | 1.3 | 16.5 | 83.8 | 1.0 | 0.13 | 0.58 | 0.04 | 0.39 | 0.76 |
| Example 7 | 0.7 | −0.8 | 3.4 | 4.1 | 7.6 | 0.5 | 1.2 | 11.4 | 85.2 | 1.0 | 0.12 | 0.58 | 0.04 | 0.44 | 0.73 |
| Example 8 | 0.8 | −0.3 | 5.9 | 4.1 | 10.0 | 0.6 | 1.2 | 12.4 | 85.0 | 1.5 | 0.12 | 0.87 | 0.05 | 0.64 | 0.74 |
| Example 9 | 0.7 | −0.2 | 4.7 | 3.5 | 8.1 | 0.6 | 1.0 | 10.1 | 85.0 | 1.4 | 0.10 | 0.76 | 0.04 | 0.61 | 0.76 |
| Example 10 | 0.9 | −0.3 | 6.9 | 5.0 | 11.9 | 0.7 | 1.3 | 11.4 | 86.1 | 1.8 | 0.13 | 1.01 | 0.05 | 0.76 | 0.78 | the load curve. In Example 6, the mold 90 with a transfer surface capable of forming irregularities as shown in FIG. 15A was used.

As shown in Table 4, the transmittance in the D65 light source was 47.5%, and the haze was 8.2%. Further, the lamp reflected light intensity attenuation rate was −14.0 dB.

That is, a small value was obtained as the haze, and a value not large as the lamp reflected light intensity attenuation rate was obtained. As a result, a low haze and a relatively wide viewing angle were both attained, and good characteristics as an image projecting window were obtained.

Example 7

Figure 16A:
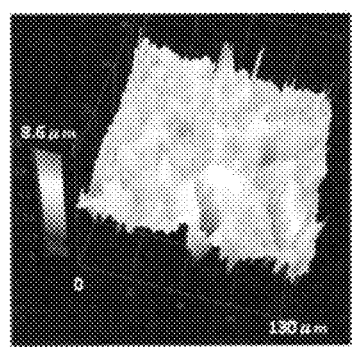
FIGS. 16A-16C are explanatory views showing the three-dimensional shape of the irregularity surface of the first transparent layer in Example 7, the two-dimensional cross-sectional profile in one cross section and the load curve.
Figure 16B:
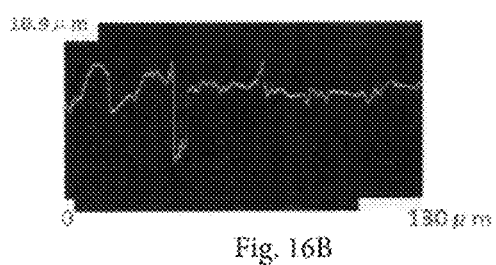
Figure 16C:
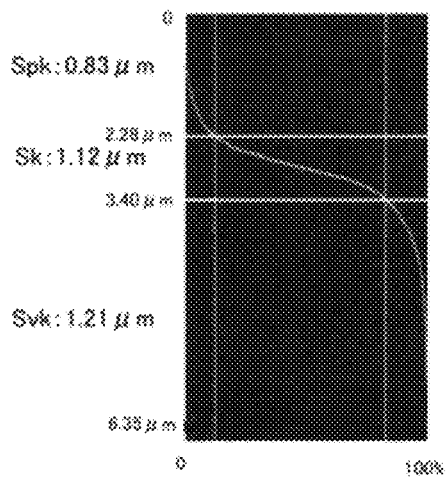

FIGS. 16A, 16B and 16C are explanatory views showing A: the three-dimensional shape of the irregularity surface of the first transparent layer 21 at a part of the image projecting window in Example 7, B: the two-dimensional surface shape (two dimensional cross-sectional profile) in one cross section perpendicular to the surface of to the substrate 10, and C: the load curve. In Example 7, the mold 90 with a transfer surface capable of forming irregularities as shown in FIG. 16A was used.

As shown in Table 4, the transmittance in the D65 light source was 45.9%, and the haze was 8.2%. Further, the lamp reflected light intensity attenuation rate was −9.6 dB.

That is, a small value was obtained as the haze, and a small value was obtained as the lamp reflected light intensity attenuation rate. As a result, a low haze and a wide viewing angle were both attained, and good characteristics as an image projecting window were obtained.

Example 8

Figure 17A:
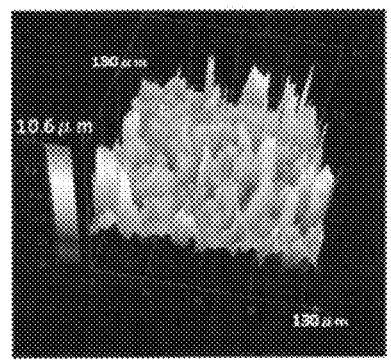
FIGS. 17A-17C are explanatory views showing the three-dimensional shape of the irregularity surface of the first transparent layer in Example 8, the two-dimensional cross-sectional profile in one cross section and the load curve.
Figure 17B:
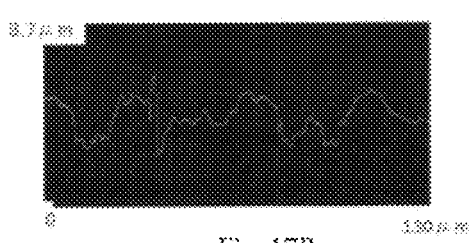
Figure 17C:
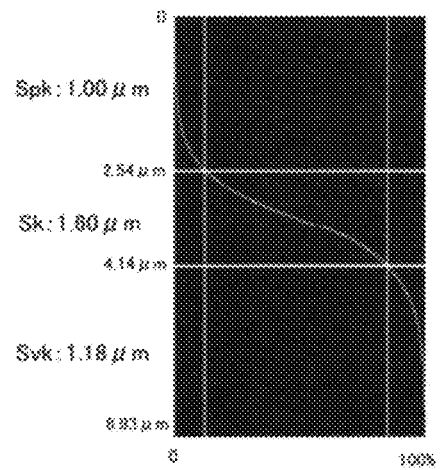

FIGS. 17A, 17B and 17C are explanatory views showing A: the three-dimensional shape of the irregularity surface of the first transparent layer 21 at a part of the image projecting window in Example 8, B: the two-dimensional surface shape (two dimensional cross-sectional profile) in one cross section perpendicular to the surface of the substrate 10, and C: the load curve. In Example 8, the mold 90 with a transfer surface capable of forming irregularities as shown in FIG. 17A was used.

As shown in Table 4, the transmittance in the D65 light source was 44.9%, and the haze was 11.5%. Further, the lamp reflected light intensity attenuation rate was −8.0 dB.

That is, a relatively small value was obtained as the haze, and a small value was obtained as the lamp reflected light intensity attenuation rate. As a result, a low haze and a wide viewing angle were both attained, and good characteristics as an image projecting window were obtained.

Example 9

Figure 18A:
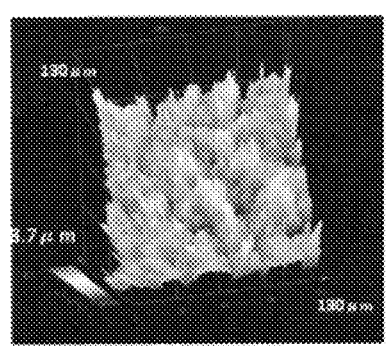
FIGS. 18A-18C are explanatory views showing the three-dimensional shape of the irregularity surface of the first transparent layer in Example 9, the two-dimensional cross-sectional profile in one cross section and the load curve.
Figure 18B:
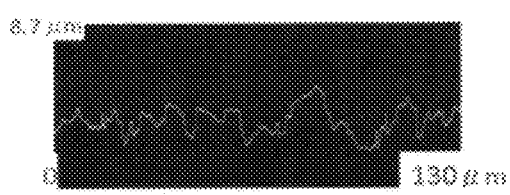
Figure 18C:
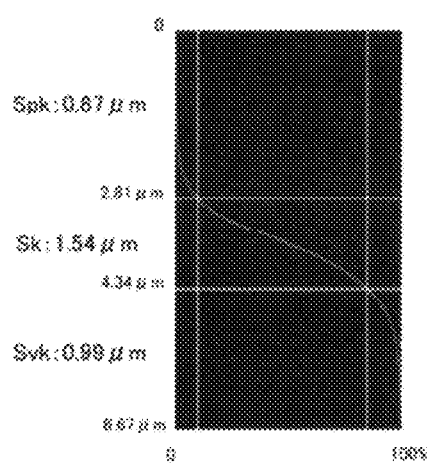

FIGS. 18A, 18B and 18C are explanatory views showing A: the three-dimensional shape of the irregularity surface of the first transparent layer 21 at a part of the image projecting window in Example 9, B: the two-dimensional surface shape (two dimensional cross-sectional profile) in one cross section perpendicular to the surface of the substrate 10, and C: the load curve. In Example 9, the mold 90 with a transfer surface capable of forming irregularities shown in FIG. 18A was used.

As shown in Table 4, the transmittance in the D65 light source was 39.7%, and the haze was 11.9%. Further, the lamp reflected light intensity attenuation rate was −6.0 dB.

That is, a relatively small value was obtained as the haze, and a small value was obtained as the lamp reflected light intensity attenuation rate. As a result, a low haze and a wide viewing angle were both attained, and good characteristics as an image projecting window were obtained.

Example 10

Figure 19A:
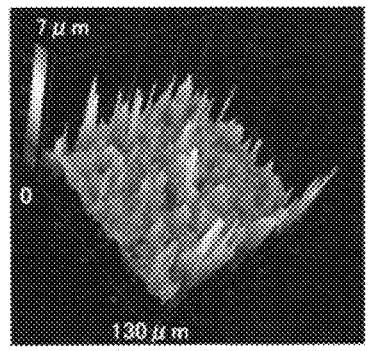
FIGS. 19A-19C are explanatory views showing the three-dimensional shape of the irregularity surface of the first transparent layer in Example 10, the two-dimensional cross-sectional profile in one cross section and the load curve.
Figure 19B:
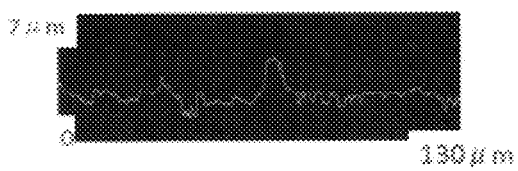
Figure 19C:
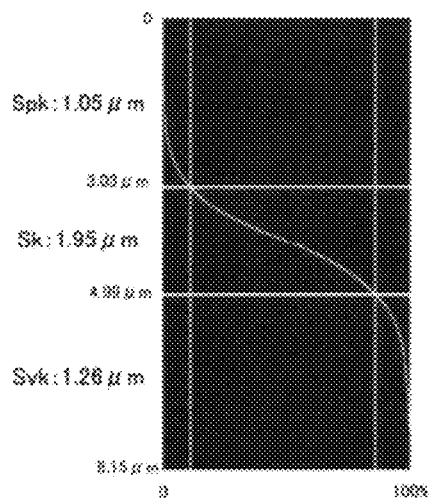

FIGS. 19A, 19B and 19C are explanatory views showing A: the three-dimensional shape of the irregularity surface of the first transparent layer 21 at a part of the image projecting window in Example 10, B: the two-dimensional surface shape (two dimensional cross-sectional profile) in one cross section perpendicular to the surface of the substrate 10, and C: the load curve. In Example 10, the mold 90 with a transfer surface capable of forming irregularities as shown in FIG. 19A was used.

As shown in Table 4, the transmittance in the D65 light source was 40.3%, and the haze was 13.0%. Further, the lamp reflected light intensity attenuation rate was −4.4 dB.

That a relatively small value was obtained as the haze, and a small volume was obtained as the lamp reflected light intensity attenuation rate. As a result, a low haze and a wide viewing angle were both attained, and good characteristics as an image projecting window were obtained.

Example 11

On a polyethylene terephthalate resin film, a thermoplastic resin having acrylic fine particles (average particle size: 3 μm) dispersed, was applied by die coating, to prepare a mold 90 having irregularities 90a formed on its surface. Then, on a polyethylene terephthalate resin film prepared separately, a UV curable resin was applied by die coating, and the mold 90 was placed thereon. The mold 90 was placed so that the surface having irregularities 90a formed, would be on the UV curable resin, and the UV curable resin was cured by irradiation with UV light of 1,000 mJ from the side of the mold 90. The mold 90 was peeled, and the surface shape of the irregularity surface was measured. Then, on the irregular surface, an Ag film was formed in a thickness of 12 nm by a sputtering method. On the Ag film, a UV curable resin was applied by die coating, and the UV curable resin was cured by irradiation with UV light of 1,000 mJ from the side of the UV curable resin.

Figure 20A:
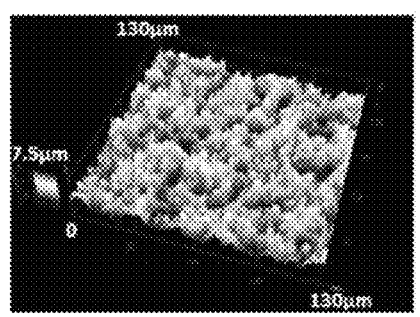
FIGS. 20A-20C are explanatory views showing the three-dimensional shape of the irregularity surface of the first transparent layer in Example 11, the two-dimensional cross-sectional profile in one cross section and the load curve.
Figure 20B:
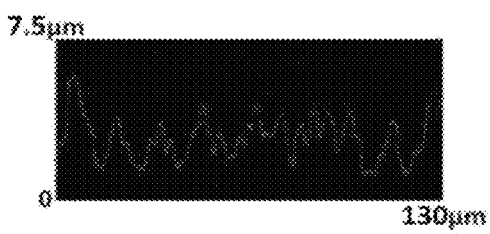
Figure 20C:
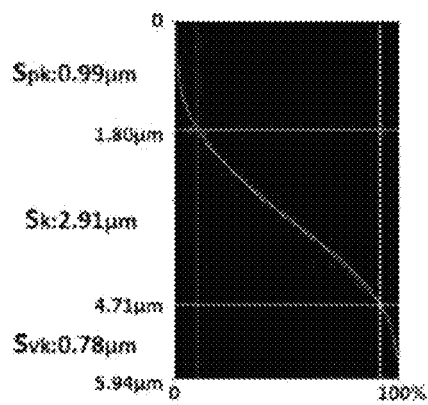

FIGS. 20A, 20B and 20C are is explanatory views showing A: the three-dimensional shape of the irregularity surface of the first transparent layer 21 at a part of the image projecting window in Example 11, B: the two-dimensional surface shape (two dimensional cross-sectional profile) in one cross section perpendicular to the surface of the substrate 10, and C: the load curve.

Example 12

The mold 90 was prepared in the same manner as in Example 11, except that a thermoplastic resin having acrylic fine particles (average particle size: 1 μm) different in the average particle size from the acrylic fine particles used in Example 11 dispersed, was used.

Figure 21A:
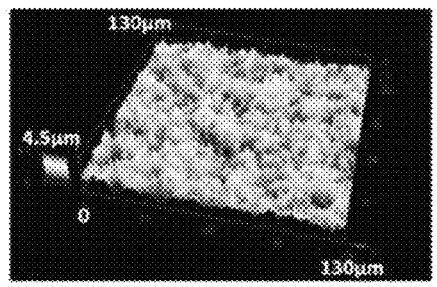
FIGS. 21A-21C are explanatory views showing the three-dimensional shape of the irregularity surface of the first transparent layer in Example 12, the two-dimensional cross-sectional profile in one cross section and the load curve.
Figure 21C:
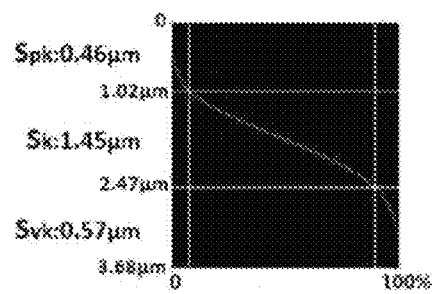
Figure 21B:
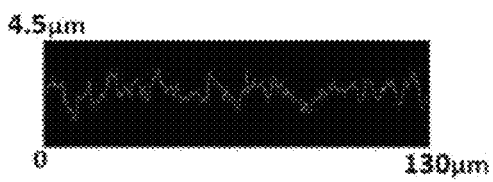

FIGS. 21A, 21B and 21C are explanatory views showing A: the three-dimensional shape of the irregularity surface of the first transparent layer 21 at a part of the image projecting window in Example 12, B: the two-dimensional surface shape (two dimensional cross-sectional profile) in one cross section perpendicular to the surface of the substrate 10, and C: the load curve.

Example 13

The mold 90 was prepared in the same manner as in Example 11, except that a thermoplastic resin having acrylic fine particles (average particle size: 0.8 μm) different in the average particle size from the acrylic fine particles used in Example 11 dispersed, was used.

Figure 22A:
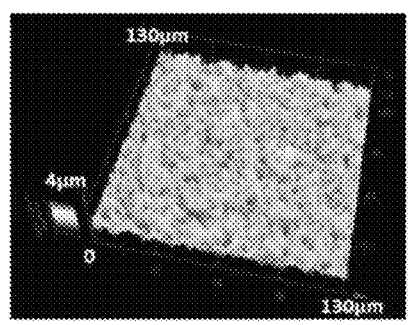
FIGS. 22A-22C are explanatory views showing the three-dimensional shape of the irregularity surface of the first transparent layer in Example 13, the two-dimensional cross-sectional profile in one cross section and the load curve.
Figure 22C:
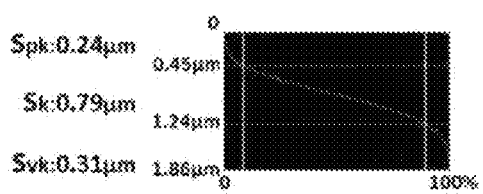
Figure 22B:
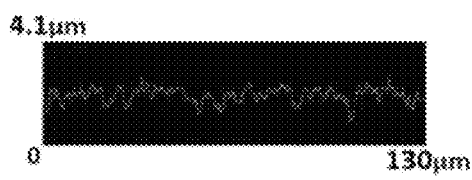

FIGS. 22A, 22B and 22C are explanatory views showing A: the three-dimensional shape of the irregularity surface of the first transparent layer 21 at a part of the image projecting window in Example 13, B: the two-dimensional surface shape (two dimensional cross-sectional profile) in one cross section perpendicular to the surface of the substrate 10, and C: the load curve.

Comparative Example 4

The mold 90 was prepared in the same manner as in Example 11, except that a thermoplastic resin having acrylic fine particles (average particle size: 5 μm) different in the average particle size from the acrylic fine particles used in Example 11 dispersed, was used.

Figure 23A:
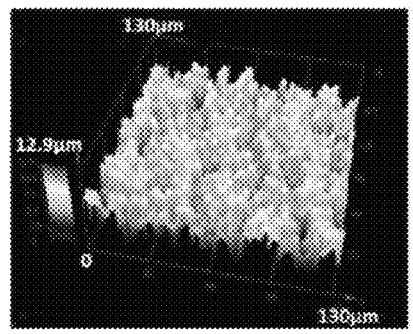
FIGS. 23A-23C are explanatory views showing the three-dimensional shape of the irregularity surface of the first transparent layer in Comparative Example 4, the two-dimensional cross-sectional profile in one cross section and the load curve.
Figure 23B:
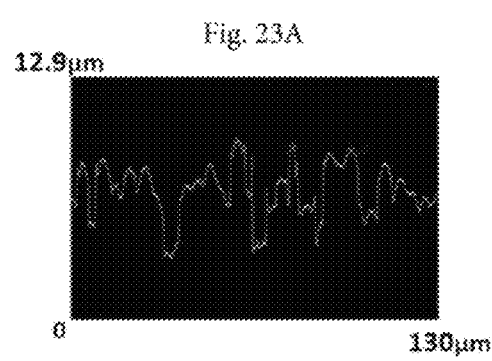
Figure 23C:
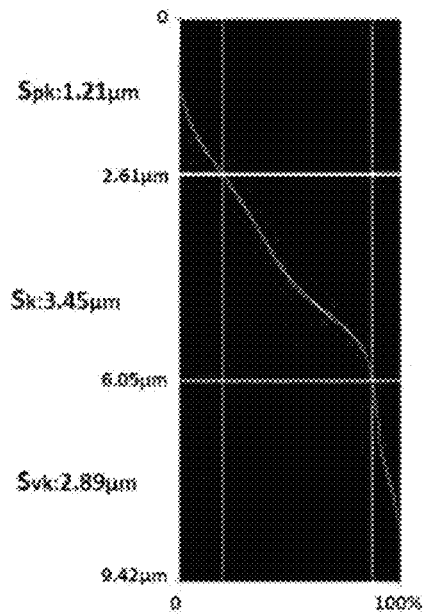

FIGS. 23A, 23B and 23C are explanatory views showing A: the three-dimensional shape of the irregularity surface of the first transparent layer 21 at a part of the image projecting window in Comparative Example 4, B: the two-dimensional surface shape (two dimensional cross-sectional profile) in one cross section perpendicular to the surface of the substrate 10, and C: the load curve.

The three-dimensional surface shape parameters and optical characteristics in Examples 11 to 13 and Comparative Example 4, similar in Tables 4 and 5 are shown in Tables 6 and 7.

ibility of the background, and the haze of the image projecting window in each of Examples 1 to 5 is at most 7%.

As apparent from Table 2, Table 4 and Table 6, the transmittance of visible light of the image projecting window in each of Examples 1 to 13, is within the preferred range.

In FIG. 24, with respect to Examples 1 to 13 and Comparative Examples 1 to 4, the lamp reflected light intensity attenuation rate as an index relating to the viewing angle, and the ratio of the haze/visible light diffuse reflectance as an index relating to the haze, are plotted. To the line of Examples 4 to 13 where both properties become a trade-off, Examples 1 to 3 are plotted in a region inside thereof, i.e. in a region where both the lamp reflected light intensity attenuation rate and the haze are lower, thus indicating that they are more preferred. Whereas, Comparative Examples 1 to 4 are plotted in a region outside of the line of Examples 4 to 13, thus indicating that they are undesirable examples.

Figure 25:
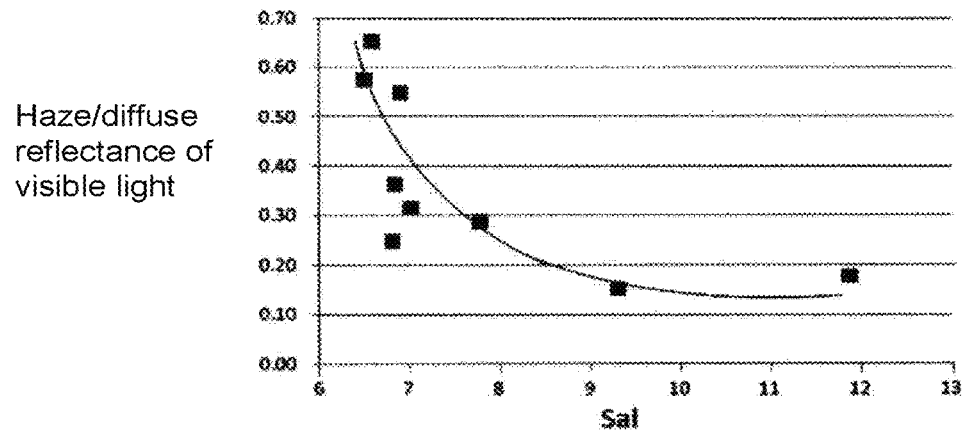
FIG. 25 is an explanatory diagram showing the relationship between the shortest autocorrelation length Sal and the value obtained by dividing the haze by the diffuse reflectance of visible light.
Figure 26:
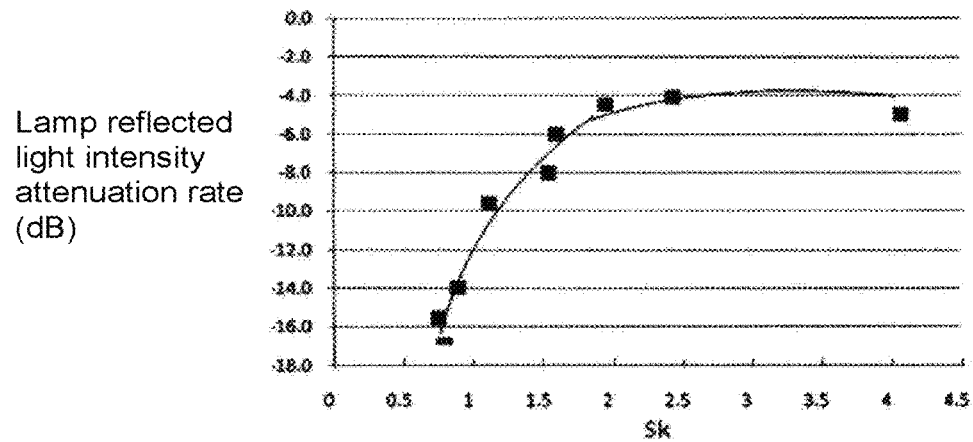
FIG. 26 is an explanatory diagram showing the relationship between the vertical difference Sk in the core section and the lamp reflection intensity attenuation rate.

FIG. 25 is an explanatory diagram showing the relationship between the shortest autocorrelation length Sal relating to the surface shape of the first transparent layer 21 in the image projecting window in each of Examples 1, 2, 4 to 10 and the value obtained by dividing the haze by the diffuse reflectance of visible light. FIG. 26 is an explanatory diagram showing the relationship between the vertical difference Sk of the core section and the lamp reflection intensity attenuation rate.

As shown in FIGS. 24 and 25, in Examples, the value obtained by dividing the haze by the diffuse reflectance of visible light is at least 0.1. Whereas in Comparative Examples, it is 0.08 or at least 1.06 (see Table 2). Therefore, a preferred value as the value obtained by dividing the haze

TABLE 6

|  | Sku | Spk [μm] | Sk [μm] | Sal [μm] | Sal/Sk | Transmittance of visible light [%] | Haze [%] | Diffuse reflectance of visible light Rv [%] | Haze/Rv | Lamp reflected light intensity attenuation rate [dB] | Number of inflection points per 10 μm [number/10 μm] |
|---|---|---|---|---|---|---|---|---|---|---|---|
| Example 11 | 2.6 | 1.0 | 2.9 | 5.3 | 1.8 | 52.3 | 14.9 | 18.3 | 0.81 | −2.7 | 26.3 |
| Example 12 | 3.0 | 0.5 | 1.5 | 5.2 | 3.6 | 51.6 | 11.3 | 19.1 | 0.59 | −2.0 | 21.6 |
| Example 13 | 2.9 | 0.2 | 0.8 | 2.6 | 3.3 | 49.5 | 11.5 | 20.4 | 0.56 | −1.7 | 22.3 |
| Comparative Example 4 | 2.9 | 1.2 | 3.5 | 5.9 | 1.7 | 53.3 | 20.6 | 17.0 | 1.21 | −3.8 | 31.4 |

TABLE 7

|  | Sq [μm] | Ssk | Sp [μm] | Sv [μm] | Sz [μm] | Sa [μm] | Svk [μm] | SMr1 [%] | SMr2 [%] | Sxp [μm] | Vvv [μm³/μm²] | Vvc [μm³/μm²] | Vmp [μm³/μm²] | Vmc [μm³/μm²] | Str |
|---|---|---|---|---|---|---|---|---|---|---|---|---|---|---|---|
| Example 11 | 1.1 | 0.1 | 3.6 | 2.9 | 6.6 | 0.9 | 0.8 | 10.2 | 91.6 | 2.4 | 0.10 | 1.38 | 0.05 | 1.02 | 0.62 |
| Example 12 | 0.6 | −0.2 | 2.3 | 2.2 | 4.5 | 0.4 | 0.6 | 7.9 | 89.6 | 1.1 | 0.07 | 0.64 | 0.02 | 0.50 | 0.77 |
| Example 13 | 0.3 | −0.2 | 1.9 | 1.9 | 3.8 | 0.2 | 0.3 | 8.9 | 89.3 | 0.6 | 0.04 | 0.36 | 0.01 | 0.28 | 0.84 |
| Comparative Example 4 | 1.7 | −0.4 | 6.5 | 6.6 | 13.1 | 1.4 | 2.9 | 19.5 | 87.4 | 3.3 | 0.29 | 1.93 | 0.04 | 1.34 | 0.67 |

In order to obtain a sufficient function as a window to transmit the background, the haze is preferably at most 17% and the haze of the image projecting window in each of Examples 1 to 13 is at most 17%. In order to make the visibility of the background better, the haze is preferably at most 10%, and the haze of the image projecting window in each of Examples 1 to 7 is at most 10%. The haze being at most 7% is preferred in order to further improve the visby the diffuse reflectance of visible light can be said to be approximately at least 0.1 and at most 1.0.

In order to make the visibility of the background better, the value obtained by dividing the haze by the diffuse reflectance of visible light is preferably at least 0.1 and at most 0.5 (corresponding to Examples 1 to 7). Further, in order to further improve the visibility of the background, the value obtained by dividing the haze by the diffuse reflectance of visible light is preferably at least 0.1 and at most 0.3 (corresponding to Examples 1 to 5).

In order to secure a wide viewing angle, the value of the lamp reflection intensity attenuation rate is preferably small (by absolute value), and, as shown in FIGS. 24 and 26, in the case of Examples 1 to 13, it is smaller than −18 dB (by absolute value).

Here, when attention is paid to the lamp reflection intensity attenuation rate, as compared with Comparative Example 3, in order to improve so that the viewing angle becomes wider, the value is preferably at most −20 dB (by absolute value). In order to obtain a wider viewing angle, the lamp reflection intensity attenuation rate is more preferably at most −10 dB (by absolute value) (corresponding to Examples 1 to 3, 7 to 13). In order to obtain a still wider viewing angle, the lamp reflection intensity attenuation rate is still more preferably at most −5 dB (by absolute value) (corresponding to Examples 1 to 3 and 10 to 12).

FIGS. 27A and 27B are explanatory diagrams showing A: the relationship between the value (Sal/Sk) obtained by dividing the shortest autocorrelation length Sal by the vertical difference Sk in the core section, and the value obtained by dividing the haze by the diffuse reflectance of visible light, and B: the relation between Sal/Sk and the lamp reflection intensity attenuation rate, in the case of Examples 4 to 10 wherein kurtosis Sku is at least 4 (see Table 4).

Figure 28:
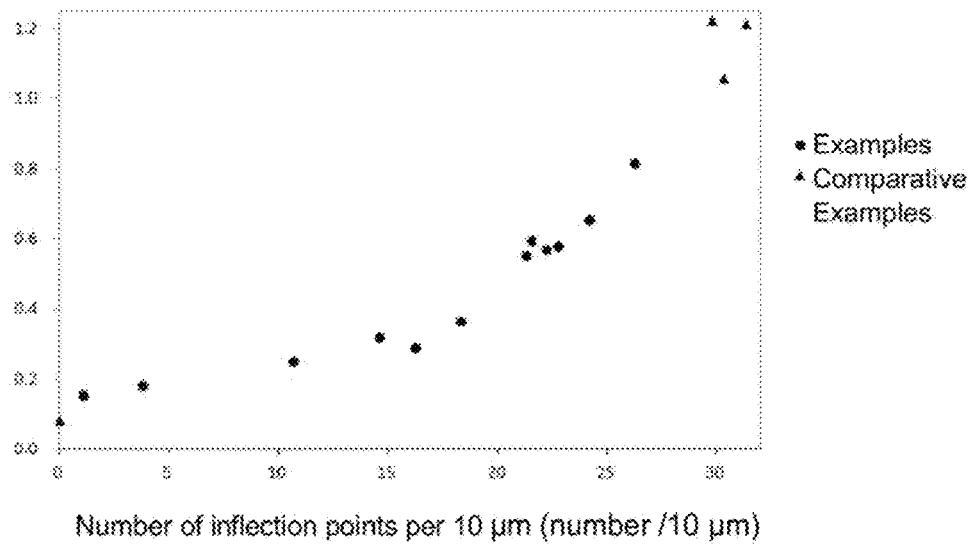
FIG. 28 is an explanatory diagram showing the number of inflection points of irregularities in the surface shape of the first transparent layer.
Figure 29:
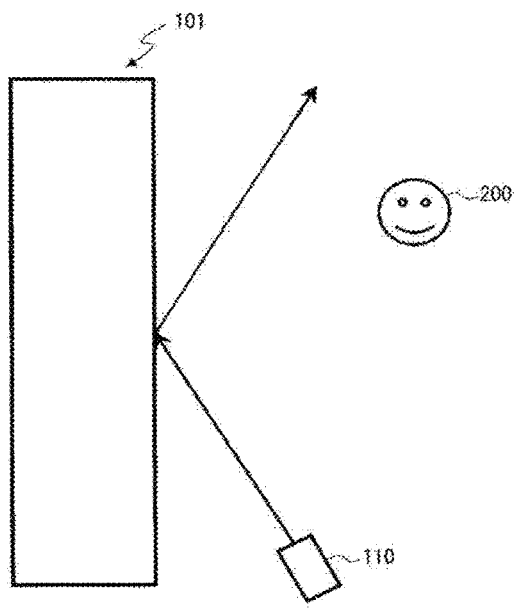
FIG. 29 is an explanatory diagram for explaining usage of the image projecting structure.
Figure 30:
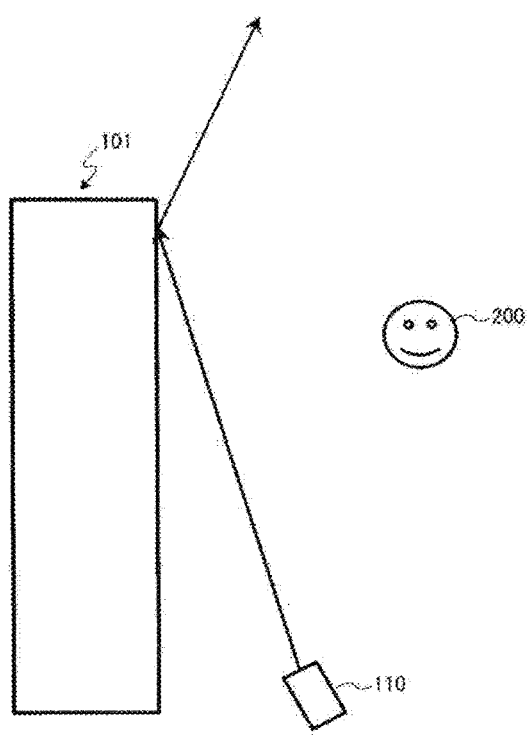
FIG. 30 is an explanatory diagram for explaining usage of the image projecting structure.
Figure 31:
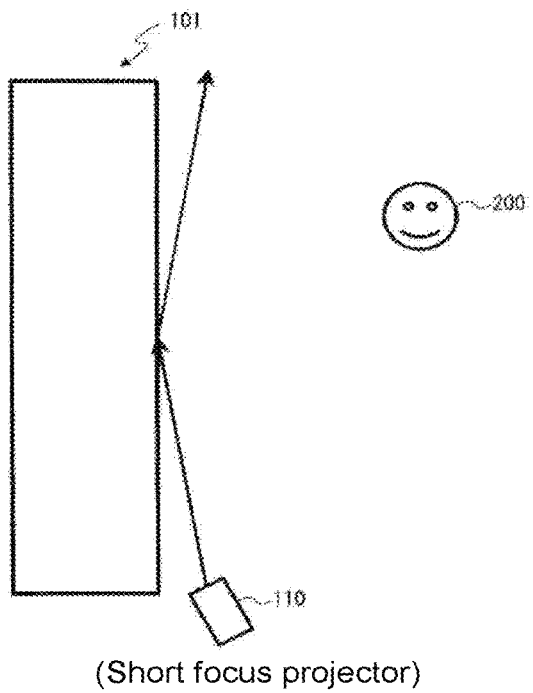
FIG. 31 is an explanatory diagram for explaining usage of the image projecting structure.
Figure 32:
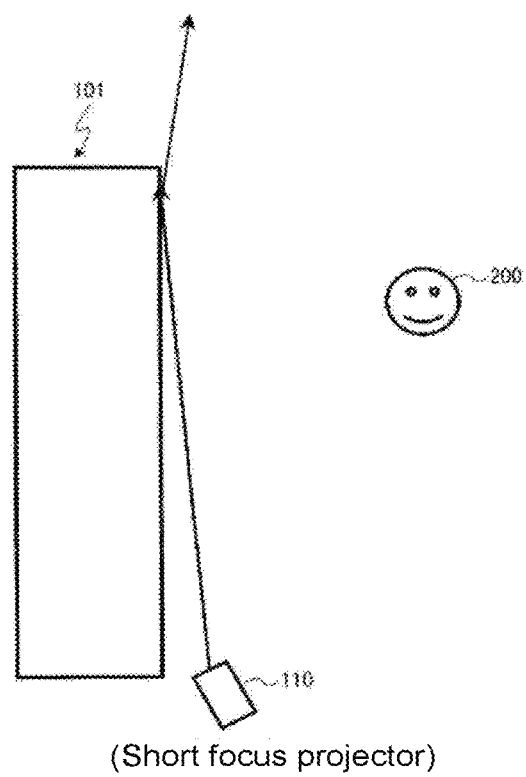
FIG. 32 is an explanatory diagram for explaining usage of the image projecting structure.

The irregularities of the surface shape of the first transparent layer 21 in the image projecting structure 100 in each of Examples 1 to 13 and Comparative Examples 1 to 4, were evaluated. Specifically, the number of inflection points was counted in a two-dimensional cross-sectional profile (measured length 130 μm×1,024 pieces) obtained by dividing the three-dimensional surface shape profile in a 130 μm square region measured at a surface resolution of 0.12 μm and a height resolution of 0.01 μm, into 1,024 pieces by the cross section perpendicular to the surface of the substrate 10. The number of inflection points in a two-dimensional cross-sectional profile (specifically, a cross-sectional curve in a cross section parallel to the normal direction of the first transparent layer 21) in one cross section perpendicular to the surface of the substrate 10, was counted. FIG. 28 is an explanatory diagram showing the relationship between the number of inflection points per 10 μm of measurement length, and the value obtained by dividing the haze by the diffuse reflectance of visible light.

In FIG. 28, the visibility was good when the number of inflection points was at least 0.1/10 μm and at most 28/10 μm.

Two-dimensional surface roughness parameters in Examples 1 to 13 are shown in Table 8.

In the two-dimensional surface roughness parameters in Examples 1 to 13, Rsm representing the average length as a roughness curve element, showed a generally positive correlation with Sal as the shortest autocorrelation length in the three-dimensional surface roughness parameter (see Tables 2, 4, 6 and 8). Further, Rq and Sq, and Ra and Sa, respectively, showed generally positive correlations. In Examples 1 to 13, Rku showed a generally positive correlation with Sku. In Examples 1 to 13, RΔq represents an inclination of the roughness curve and showed a generally negative correlation with Sal/Sq. Further, in Examples 1 to 13, ones having a positive correlation with haze/Rv, so that the value of haze/Rv is small when the value of RΔq is small, were obtained.

TABLE 8

|  | Rp [μm] | Rv [μm] | Rz [μm] | Rc [μm] | Rt [μm] | Ra [μm] | Rq [μm] | Rsk | Rku | Rsm [μm] | RΔq [°] | Rδc [μm] |
| --- | --- | --- | --- | --- | --- | --- | --- | --- | --- | --- | --- | --- |
| Example 1 | 1.96 | 1.96 | 3.92 | 2.64 | 4.46 | 0.88 | 1.05 | 0.24 | 2.17 | 25.62 | 38.07 | 2.03 |
| Example 2 | 1.65 | 1.97 | 3.61 | 1.64 | 3.81 | 0.62 | 0.81 | −0.33 | 3.10 | 16.70 | 36.00 | 1.21 |
| Example 3 | 9.63 | 4.05 | 13.68 | 9.41 | 14.90 | 2.82 | 3.54 | 1.22 | 3.63 | 49.85 | 174.88 | 5.74 |
| Example 4 | 0.44 | 0.49 | 0.93 | 0.58 | 1.54 | 0.18 | 0.22 | 0.19 | 2.64 | 18.16 | 10.48 | 0.40 |
| Example 5 | 0.61 | 1.59 | 2.20 | 0.86 | 3.34 | 0.29 | 0.41 | −2.03 | 10.36 | 15.74 | 38.79 | 0.56 |
| Example 6 | 1.12 | 1.84 | 2.96 | 1.56 | 4.12 | 0.40 | 0.54 | −1.03 | 4.44 | 20.88 | 36.26 | 0.74 |
| Example 7 | 1.43 | 2.14 | 3.57 | 1.30 | 3.94 | 0.39 | 0.58 | −0.74 | 5.34 | 13.60 | 44.55 | 0.60 |
| Example 8 | 1.96 | 1.62 | 3.58 | 1.81 | 4.11 | 0.54 | 0.69 | −0.07 | 3.29 | 14.59 | 49.33 | 1.11 |
| Example 9 | 2.79 | 2.22 | 5.00 | 2.22 | 5.39 | 0.64 | 0.87 | −0.0045 | 3.73 | 12.15 | 67.09 | 1.07 |
| Example 10 | 2.73 | 1.78 | 4.50 | 2.05 | 5.27 | 0.62 | 0.80 | 0.72 | 4.40 | 14.03 | 68.21 | 1.29 |
| Example 11 | 2.17 | 1.89 | 4.06 | 2.16 | 4.56 | 0.74 | 0.91 | 0.22 | 2.64 | 10.70 | 71.11 | 1.68 |
| Example 12 | 1.24 | 1.12 | 2.36 | 1.24 | 2.49 | 0.39 | 0.48 | 0.05 | 2.88 | 9.75 | 40.58 | 0.80 |
| Example 13 | 0.63 | 0.73 | 1.36 | 0.81 | 1.52 | 0.22 | 0.27 | −0.24 | 2.87 | 8.71 | 28.52 | 0.46 |

Further, also with respect to Rp, Rz, Rt, Ra and Rq, a generally positive correlation with haze/Rv was observed (Examples 2 and 4 to 13). Further, as the values of Rp, Rz, Rt, Ra and Rq became larger, the attenuation rate of the lamp reflected light intensity generally tended to be small, i.e. a tendency that the viewing angle became wide, was observed (Examples 1 to 13).

Next, applications of the image projecting structure 100 in the foregoing embodiments and Examples will be described.

As use of the structure in a construction such as a building, the following applications may be mentioned.

Use for a showcase, a display case, a showroom, an interior such as a door, a partition, a wall, etc. to display a variety of information, such as information of a display or educational information by projecting an image.

Use for an outer wall of a building, etc. to display a variety of information such as CM or projection mapping by projecting an image.

As use for a table top, a casing, etc., the following applications may be mentioned.

A table top, a counter, a desk (desktop), a kitchen counter, and a window of a vending machine.

Further, by placing another display device behind the transparent screen of the present invention, it is possible to display an image with depth or to display an image of different movement as superimposed.

Further, as use for a vehicle, the following applications may be mentioned.

In a railway vehicle, window glass on the back side of the driver's seat, side window glass for railway, hanging for advertising.

In an automobile, etc.,
shade portion of front glass, front glass for automotive, side glass for automotive, sun visor for automotive, in-vehicle partition, around a meter.

As one utilizing a diffusion function of reflected light, antiglare glass or glare-proof mirror may be mentioned. Further, as other special applications, cover glass for traffic lights (integration of various signal displays), etc. may be mentioned. Still further, in an automobile, a train, etc., the structure may be used for both a head-up display and a transparent screen.

REFERENCE SYMBOLS 10, 11: transparent substrate, 21: first transparent layer, 22: second transparent layer, 30: reflective layer, 40: first transparent film (transparent film), 41: second transparent film, 90: mold, 100: image projecting structure, 200: observer.

What is claimed is:

1. An image projecting structure comprising
a first transparent layer having irregularities formed on its surface,
a reflective film formed on the surface on which the irregularities are formed, of the first transparent layer, and
a second transparent layer formed on the reflective film, characterized in that
the transmittance of visible light of the image projecting structure is from 5 to 95%,
the value obtained by dividing the haze by the diffuse reflectance of visible light is at least 0.1 and at most 1,
the vertical difference Sk in the core section defined by ISO 25178 of the surface on which the irregularities are formed, is at least 0.1 μm, and
the value obtained by dividing the shortest autocorrelation length Sal by the vertical difference Sk in the core section is at least 1.2 and at most 190.

2. The image projecting structure according to claim 1, wherein
in the two-dimensional cross-sectional profile which represents the shape of the irregularities, from 0.1 to 28 inflection points are contained per 10 μm, and
the value obtained by dividing the shortest autocorrelation length Sal of the irregularities in the first transparent layer by the vertical difference Sk in the core section is at most 95.

3. The image projecting structure according to claim 1, wherein the kurtosis Sku of the irregularities in the first transparent layer is at most 3.5.

4. The image projecting structure according to claim 1, wherein the kurtosis Sku of the irregularities in the first transparent layer is more than 3.5,
the height of protruding peak Spk is at least 0.01 μm and at most 3 μm, and
the value obtained by dividing the shortest autocorrelation length Sal by the vertical difference Sk in the core section is at least 3.

5. The image projecting structure according to claim 3, wherein Sal/Sk of the irregularities in the first transparent layer is at most 12.

6. The image projecting structure according to claim 1, wherein the arithmetic mean Sa of the irregularities in the first transparent layer is at least 0.1 μm and at most 20 μm.

7. The image projecting structure according to claim 1, wherein the root mean square Sq of the irregularities in the first transparent layer is at least 0.1 μm and at most 10 μm.

8. The image projecting structure according to claim 1, wherein the reflective film is formed by at least one material selected from the group consisting of a metal, a metal oxide, a metal nitride and a semiconductor.

9. The image projecting structure according to claim 1, wherein when the direction normal to the surface is set to be 0°, and the direction parallel to the surface is set to be 90°, the absolute value of the attenuation rate calculated from the reflection intensities at detection angles of 70° and 5°, is at most 20 dB.

10. An image projecting method characterized by projecting an image from a projector to the image projecting structure as defined in claim 1.

11. The image projecting structure according to claim 1, wherein the surface shape parameters of the irregularity surface are values measured at a cutoff value being 80 μm.

* * * * *